US009071603B1

(12) United States Patent
Frederick et al.

(10) Patent No.: US 9,071,603 B1
(45) Date of Patent: Jun. 30, 2015

(54) DISTRIBUTED DISPLAY FUNCTIONALITY ON MULTIPLE MOBILE DEVICES

(71) Applicant: Mediolo, LLC, Seattle, WA (US)

(72) Inventors: Robert Frederick, Seattle, WA (US); Justin Yu, Bellevue, WA (US); Justin Arruda, Cranston, RI (US); Darren Austin, Seattle, WA (US)

(73) Assignee: Sirqul, Inc., Seattle, WA (US)

( * ) Notice: Subject to any disclaimer, the term of this patent is extended or adjusted under 35 U.S.C. 154(b) by 293 days.

(21) Appl. No.: 13/725,531

(22) Filed: Dec. 21, 2012

Related U.S. Application Data

(60) Provisional application No. 61/580,615, filed on Dec. 27, 2011.

(51) Int. Cl.
*G06F 13/00* (2006.01)
*H04L 29/08* (2006.01)
(52) U.S. Cl.
CPC ...................................... *H04L 67/10* (2013.01)
(58) Field of Classification Search
CPC .............. A63F 13/12; A63F 2300/407; A63F 2300/50; G07F 17/32; G07F 17/323; H04L 29/08072; H04L 29/06; H04L 29/0809; H04L 29/06047; H04L 67/10; G06Q 30/02
USPC ........................................... 463/42; 709/203
See application file for complete search history.

(56) References Cited

U.S. PATENT DOCUMENTS

| | | | |
|---|---|---|---|
| 6,553,236 B1 | 4/2003 | Dunko et al. | |
| 6,975,873 B1 | 12/2005 | Banks et al. | |
| 7,120,455 B1 | 10/2006 | Chen et al. | |
| 7,209,755 B2 | 4/2007 | Gorday et al. | |
| 7,239,871 B2 | 7/2007 | Shamp et al. | |
| 7,359,724 B2 | 4/2008 | Torvinen | |
| 7,447,508 B1 | 11/2008 | Tendler | |
| 7,457,634 B2 | 11/2008 | Morinaga et al. | |
| 2002/0019829 A1 | 2/2002 | Shapiro | |

(Continued)

OTHER PUBLICATIONS

BuzzNetworker.com, "Facebook Feature: Sponsored Groups," accessed May 31, 2007, from http://www.buzznetworker.com/facebook-feature-sponsored-groups/, 2 pages.

(Continued)

*Primary Examiner* — Robert B Harrell
(74) *Attorney, Agent, or Firm* — Seed IP Law Group PLLC

(57) ABSTRACT

Techniques are described for providing functionality to users of mobile devices, including coordinating the inter-connection of multiple mobile devices, such as for multiple mobile devices of multiple distinct types, and optionally using multiple different types of inter-connections. In some situations, the described techniques include performing matchmaking operations to determine whether and/or how a group of multiple inter-connected mobile devices will provide functionality to each other and/or will access functionality from one or more remote server computing systems, including to select a host mobile device for the group. In addition, in some situations, the described techniques include providing a distributed display canvas functionality, by using the displays of multiple inter-connected mobile devices of a group to display some or all of the graphical user interface ("GUI") of an application, such as by displaying on each mobile device a distinct portion of the GUI specific to that mobile device.

34 Claims, 10 Drawing Sheets

(56) References Cited

U.S. PATENT DOCUMENTS

| | | | |
|---|---|---|---|
| 2002/0111173 | A1 | 8/2002 | Hendrey et al. |
| 2002/0164995 | A1 | 11/2002 | Brown et al. |
| 2002/0183072 | A1 | 12/2002 | Steinbach et al. |
| 2003/0003933 | A1 | 1/2003 | Deshpande et al. |
| 2003/0020623 | A1 | 1/2003 | Cao et al. |
| 2003/0083046 | A1 | 5/2003 | Mathis |
| 2003/0096621 | A1 | 5/2003 | Jana et al. |
| 2003/0096628 | A1 | 5/2003 | Bar-On et al. |
| 2003/0100326 | A1 | 5/2003 | Grube et al. |
| 2003/0186716 | A1 | 10/2003 | Dorenbosch et al. |
| 2004/0111184 | A1 | 6/2004 | Chiappetta et al. |
| 2004/0235568 | A1* | 11/2004 | Kim .......................... 463/42 |
| 2005/0113123 | A1 | 5/2005 | Torvinen |
| 2005/0149443 | A1 | 7/2005 | Torvinen |
| 2005/0210104 | A1 | 9/2005 | Torvinen |
| 2005/0221812 | A9 | 10/2005 | Gailey et al. |
| 2005/0233776 | A1 | 10/2005 | Allen et al. |

OTHER PUBLICATIONS

Classmates.com, "About Classmates Online, Inc.," accessed May 31, 2007, from http://www.classmates.com/cmo/about/index.jsp, 1 page.

Classmates.com, "Welcome to Help Center," accessed May 31, 2007, from http://www.classmates.com/cmo/help/index.jsp, 1 page.

Facebook.com, "About Facebook," accessed May 31, 2007, from http://www.facebook.com/about.php, 1 page.

Hafner, K., "Navigating the Amazon Circle," May 21, 2000, The New York Times, accessed May 31, 2007, from http://www.marcusbukingham.com/press/newPress/articles/NewYorkTimes/navAmazon.php?me . . . , 3 pages.

Kim, R., "Find Friends by Cell Phone: Loopt application's GPS program can beam map location," Nov. 14, 2006, SFGate.com, accessed May 31, 2007, from http://www.sfgate.com/cgi-bin/article.cgi?file=/c/a/2006/11/14/BUGMMMC1KE1.DTL&type=pr . . . , 2 pages.

Mullaney, T., "Online Shopping: Bargaining Power," Dec. 13, 1999, Businessweek Online, accessed May 31, 2007, from http://businessweek.com/1999/99_50/b3659033.htm?scriptFramed, 3 pages.

MySpace.com, "About Us," accessed May 31, 2007, from http://www.myspace.com/Modules/Common/Pages/AboutUs.aspx, 1 page.

MySpace.com, "Take the MySpace Tour!," accessed May 31, 2007, from http://collect.myspace.com/misc/tour_1.html, 6 pages.

T-Mobile, "Unlimited Cell Phone Calls to Your Five Favorite People—myFaves From T-Mobile," accessed May 31, 2007, from http://www.myfaves.com/what-is-myfaves.html, 1 page.

* cited by examiner

DISTRIBUTED DISPLAY FUNCTIONALITY ON MULTIPLE MOBILE DEVICES

CROSS-REFERENCE TO RELATED APPLICATIONS

This application claims the benefit of U.S. Provisional Patent Application No. 61/580,615, filed Dec. 27, 2011 and entitled "Distributed Functionality On Mobile Devices," which is hereby incorporated by reference in its entirety.

TECHNICAL FIELD

The following disclosure relates generally to techniques for providing functionality to users of mobile devices, such as in a distributed and coordinated manner to via multiple inter-connected mobile devices.

BACKGROUND

The use of mobile devices has become increasingly common, with many different types of mobile devices that have differing types of connectivity options and other differing types of capabilities. Various benefits may be available when multiple mobile devices are connected and used together, but difficulties exist with techniques for interconnecting and using mobile devices.

DETAILED DESCRIPTION

Figure 1A:
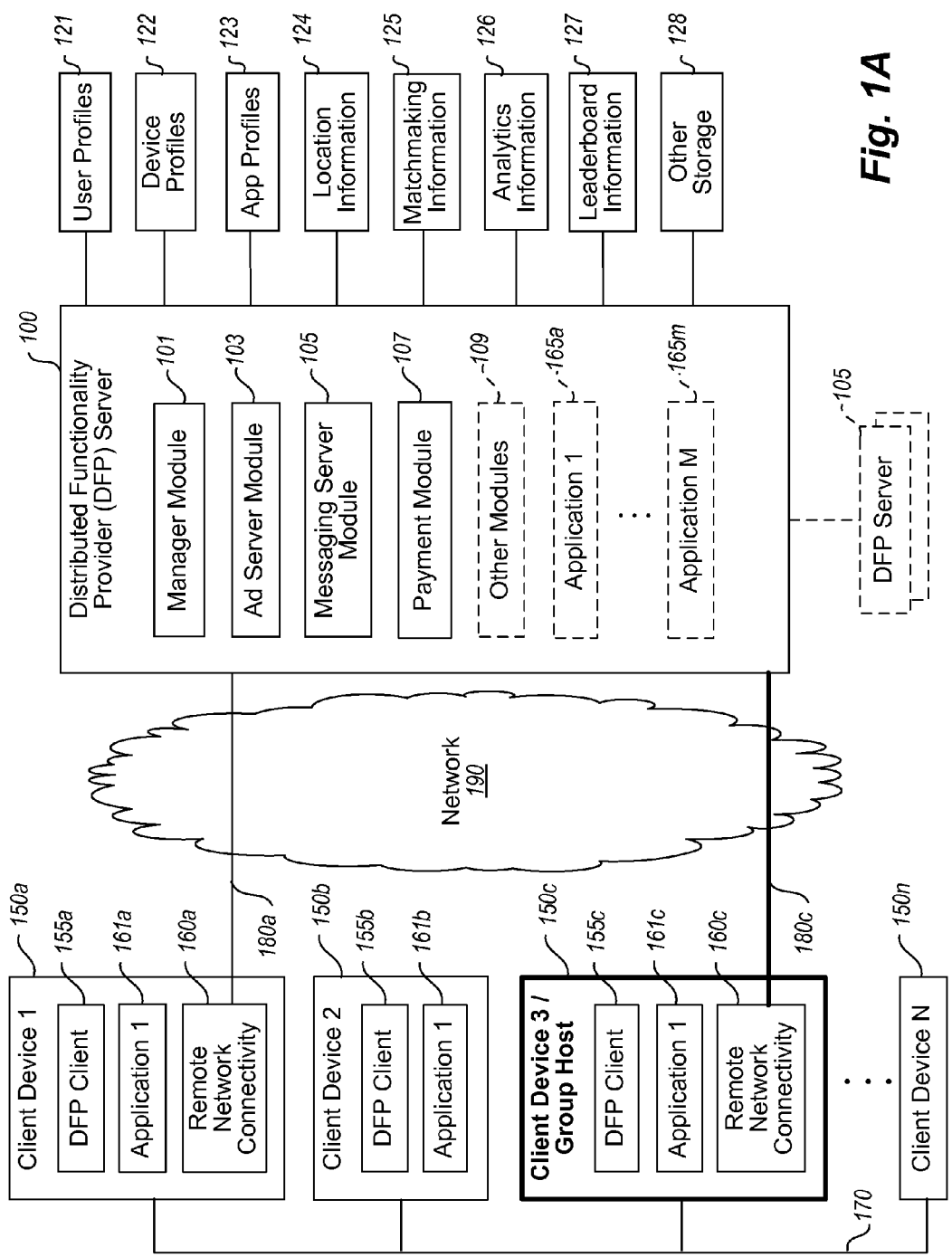
FIGS. 1A-1C are network diagrams illustrating examples of interactions that involve interconnecting and using multiple mobile devices together in a distributed manner.

Techniques are described for providing functionality to users of mobile devices. In at least some embodiments, the described techniques include coordinating the inter-connection of multiple mobile devices, such as for multiple mobile devices of multiple distinct types, and optionally using multiple different types of inter-connections. As one illustrative example, first and second mobile devices of different first and second types may be inter-connected using a first local wireless networking protocol (e.g., Bluetooth), the second device may be interconnected with a distinct third mobile device of a third type using a distinct second local wireless networking protocol (e.g., Wi-Fi), and the third mobile device may be inter-connected with one or more fourth remote server computing systems using a distinct third remote networking protocol (e.g., 3G wireless or 4G wireless using one of various underlying implementation technologies; WiMAX; etc.). To continue the illustrative example, functionality that is available from the fourth remote server computing systems may be provided to a group of some or all of the first, second and third mobile devices via the connection between the third mobile device and the fourth remote server computing systems, and the other inter-connections between the mobile devices of the group. Accordingly, to support this illustrative example, the described techniques may in some embodiments include coordinating the inter-connections between the mobile devices of the group and/or the fourth remote server computing systems in various manners, such as by selecting a particular type of inter-connection to use between two devices or systems when multiple alternatives are available, selecting one or more particular mobile devices to perform a particular type of operation on behalf of the group and/or provide a particular type of functionality to the group, etc. Additional details related to coordinating inter-connections between mobile devices of a group and/or other remote computing systems are included below, and in at least some embodiments are performed by automated operations of a computer-implemented Distributed Functionality Provider ("DFP") server system.

The described techniques include performing matchmaking operations in at least some embodiments to determine whether and/or how a group of multiple inter-connected mobile devices will provide functionality to each other and/or will access functionality from one or more remote server computing systems, including to select a host mobile device for the group, such as from multiple candidate mobile devices within the group. The host mobile device may in some embodiments and situations host various functionality that is made available to other mobile devices of the group, such as with respect to an application that is being executed and/or used in a distributed and coordinated manner by the mobile devices of the group—such situations may include those in which a connection to remote server computing systems is not currently available or in use, and the host mobile device may be selected from multiple candidate mobile devices within the group that are options for hosting the functionality for the group. In addition, the host mobile device may in some embodiments and situations provide a connection to one or more particular remote server computing systems, such as to enable functionality to be provided to the mobile devices of the group corresponding to an application that is being executed and/or used in a distributed and coordinated manner by the mobile devices of the group—in such situations, the host mobile device may be selected from multiple candidate mobile devices within the group that are options for providing such a connection.

As a first illustrative example, a particular remote server computing system may be a game server that provides, sponsors or otherwise supports one or more game applications that are playable in a coordinated manner on each of multiple inter-connected mobile devices of a group, and the matchmaking operations may include selecting at least one mobile device of the group to be a host that provides a connection to the game server, to enable the game functionality to be provided to the group of mobile devices in a coordinated and distributed manner by the game server. As a second illustrative example, a particular remote server computing system may be an application server that provides, sponsors or otherwise supports one or more groupware applications that are usable in a distributed collaborative manner on a group of multiple inter-connected mobile devices (e.g., a distributed document creation application; an application that allows inter-communications between multiple users, such as video conferencing; etc.), and the matchmaking operations may include selecting at least one mobile device of the group to be a host that provides a connection to the application server, to enable functionality of the groupware application to be provided to the group of mobile devices in a coordinated and distributed manner. In either of the first and second illustrative examples, if a connection to the remote server computing system is not currently available or in use, the host mobile device may attempt to provide some or all of the functionality that would otherwise have been provided by the remote server computing system with respect to providing distributed functionality for a application to the mobile devices of the group, such as by using information that is stored locally to the host mobile device or that is otherwise accessible to the host mobile device (e.g., is stored on one or more other mobile devices of the group). In addition to distributed games and distributed groupware applications, a variety of other types of applications may be used by a group of multiple devices in various embodiments and situations.

The matchmaking operations, such as to determine whether and/or how a group of multiple inter-connected mobile devices will provide functionality to each other and/or will access functionality from one or more remote server computing systems, may include considering one or more of a variety of factors when selecting a particular host, such as factors corresponding to the mobile devices that are part of the group, to the users associated with those mobile devices, and/or to the application being accessed. In addition, in some embodiments and situations, multiple host mobile devices may be selected for a particular group to provide distributed functionality for an application to the mobile devices of the group, such as to operate together in a distributed manner, or instead at different times or in different roles. Additional details related to such matchmaking operations are included below.

The described techniques further include providing a distributed display canvas functionality in at least some embodiments, by using the displays of multiple inter-connected mobile devices of a group to display some or all of the graphical user interface of an application, such as by displaying on each mobile device a distinct portion of the graphical user interface that is specific to a user of that mobile device. As discussed in greater detail with respect to FIGS. 3A and 3B, the distributed display canvas functionality may in some embodiments include displaying different vertical or horizontal slices of the graphical user interface of an application, such that if the multiple mobile devices of the group were lined up side-by-side and/or top-to-bottom in the correct order, a larger section of some or all of the graphical user interface would be visible across the various displays—such functionality may be provided in situations in which the mobile devices of the group are proximate to each other (e.g., within a specified number of feet, within a room, etc.) or are remote from each other (e.g., separated by one or more networks and/or by at least a minimum geographical distance). In other embodiments and situations, the different portions of the distributed display canvas may not be distinct slices, such as if each device display is analogous to a viewing pane for a distributed display canvas that is larger in both horizontal and vertical directions (and possibly in other manners) than the area of the viewing pane. In addition, in some embodiments and situations, each device in a group will show a unique portion of the distributed canvas GUI ("graphical user interface"), that is not currently shown on any other of the group devices, while in other embodiments there may be duplication or overlap between the GUI portions displayed on at least some of the group devices.

As a first illustrative example, a particular remote server computing system may be a game server as discussed above, with a GUI of a game application allowing different users to interact with different portions of the game via the distributed display canvas (e.g., in ways that their actions affect other users in other portions of the game), or instead multiple users may simultaneously interact with some or all of the same portion of the game but on different displays via the distributed display canvas. As a second illustrative example, a particular remote server computing system may be an application server as discussed above, with a GUI of an application allowing different users to interact with different functionality provided by the application via the distributed display canvas (e.g., different portions of a document being created in a distributive manner), or instead multiple users may simultaneously interact with some or all of the same functionality of the application but on different displays via the distributed display canvas (e.g., the same set of slides being displayed as part of a discussion). In either of the first and second illustrative examples, if a connection to the remote server computing system is not currently available or in use, the host mobile device may attempt to provide some or all of the functionality that would otherwise have been provided by the remote server computing system with respect to providing the distributed display canvas functionality, such as by using information that is stored locally to the host mobile device or that is otherwise accessible to the host mobile device (e.g., is stored on one or more other mobile devices of the group). In addition to distributed games and distributed applications, a variety of other types of GUIs and distributed information may be displayed via a group of multiple devices in various embodiments and situations.

The automated operations that are performed to provide display of a distributed canvas GUI may include considering one or more of a variety of factors with respect to how the GUI of an application is displayed across multiple mobile devices of a group, including in some embodiments to be controlled in whole or in part by the DFP server system, and in at least some embodiments to be controlled in whole or in part by the application (e.g., an application that is supported by but not part of the DFP server system, such as if provided by an operator that is different from the operator of the DFP server system). In addition, in some embodiments and situations, multiple host mobile devices may be selected for a particular group to provide the distributed canvas GUI display functionality for a application to the mobile devices of the group, such as to operate together in a distributed manner, or instead at different times or in different roles. Additional details related to such distributed canvas GUI display functionality are included below.

The described techniques further include providing capabilities to accommodate changes to a group of mobile devices, including with respect to a current host of the group and/or to distributed dynamic canvas functionality being provided for the group. With respect to a current host, the described techniques may include providing host migration capabilities in at least some embodiments that enable changing a host for a group of multiple mobile devices when one or more criteria are satisfied, including in some situations when a current host for the group leaves the group or otherwise becomes unavailable to serve as the host for the group (e.g., loses connection capabilities to one or more remote server computing systems, leaves a geographic location or area of the group of mobile devices, requests to no longer be the host, etc.). Such host migration capabilities may include performing additional matchmaking operations to select a new host for the group of mobile devices, whether in the same manner or a different manner from prior matchmaking operations that were previously performed to select the current host that is being replaced. For example, if a current host device for a group of multiple devices is engaged in a session of interactions with one or more remote server systems (e.g., as part of executing one or more particular applications for the group), and a new host device is selected from one of the other multiple devices in the group, the new host device may seamlessly take over and continue the same ongoing session of interactions with those one or more remote server systems.

In addition, when the mobile devices of the group are being used to provide a distributed display canvas GUI, the described techniques may further include dynamically modifying the displays on one or some or all of the mobile devices of the group to reflect a modified distributed display canvas, such as to distribute the display canvas across a different group of mobile devices when the group membership changes (e.g., a mobile device leaves the group, a mobile device joins the group, etc.). In at least some embodiments and situations, the host change operations and/or distributed display canvas modification operations may be performed dynamically while a game or other application continues to be in use by the mobile devices of the group (e.g., by continuing ongoing operations of a particular interaction session with one or more remote server systems), including to make any changes in a manner that is transparent to some or all of the mobile devices and/or their users. The host change operations and/or distributed display canvas modification operations may be performed or coordinated in some situations by one or more mobile devices of the group (e.g., by a current host device, by all of the mobile devices of the group in a distributed manner, etc.), including in situations in which a remote connection to a remote server computing system is not available or is otherwise not in use, and may also be performed or coordinated in some situations by a remote DFP Server 100. Additional details related to such modifications to functionality provided for a group of mobile devices are included below.

In addition, in at least some embodiments, a group of multiple mobile devices may be formed with respect to a particular application, such as based on those mobile devices participating in that application in a distributed manner— other groups of mobile devices may also optionally be executing that same application in a simultaneous or overlapping manner, but with each group's execution of the application being unrelated to that of the other groups. In such embodiments, the group membership for a particular group may change as users join or leave the distributed use of the application, even if a particular mobile device that joins or leaves has not changed its location or current use of mobile device capabilities. Thus, if a number of mobile devices are in a given geographic location or area (e.g., in a room or building), different subsets of the mobile devices may be joined together into different groups, and the group memberships may change not only based on the locations of the mobile devices (e.g., based on mobile devices joining or leaving the geographic location or area), but also based on changes in activities of users of the mobile devices. In some embodiments and situations, a mobile device may simultaneously be part of multiple groups, including in situations in which the mobile device is executing multiple different applications corresponding to the different groups (e.g., playing a distributed game as part of a first group of mobile devices, and participating in a distributed communication application as part of a second group of mobile devices), whether the multiple groups are distinct other than for that mobile device being in both groups, or instead have other overlapping member devices, and whether or not there are any interactions between the multiple different applications.

In addition, in some embodiments and situations, particular users and/or mobile devices may be invited to join a particular group and/or may be provided with information that enables the user and/or mobile device to perform actions to initiate joining a group. For example, a particular user may be provided with information about one or more other users that are geographically nearby, such as to enable the particular user to join those other users and participate in a group with them if so desired, or the particular user may be provided with information about one or more other users that are geographically remote but participating in particular activities of interest (e.g., using a particular application), such as to enable the particular user to logically join those other users over one or more computer networks and participate in a group with them if so desired. The information provided to the particular user may in some embodiments and situations be only partial information about the other users and/or mobile devices, such as to protect private information of the other users (e.g., as specified by those other users, such as in previously specified preferences or access controls) or for other reasons (e.g., to limit an amount of bandwidth used, to provide only information that is currently most relevant, etc.)—as one example, the provided information may indicate a general location and activities of other users, without providing information about identities of the other users.

For illustrative purposes, some embodiments are described in which particular types of functionality are provided to groups of mobile devices in particular manners. These examples are provided for illustrative purposes and are simplified for the sake of brevity, and the inventive techniques can be used in a wide variety of other situations, some of which are discussed below, including in some embodiments in which some or all of the members of a group are not mobile devices or otherwise differ from the example in one or more manners.

FIG. 1A is a network diagram illustrating an example embodiment of interactions that involve interconnecting and using multiple mobile devices together in a distributed manner. In particular, in the example of FIG. 1A, a Distributed Functionality Provider ("DFP") server program 100 is executing on one or more configured computing systems (not shown) that are remove from various mobile devices 150, in order to provide functionality to users (not shown) of the mobile devices 150 as clients of the DFP server program. The illustrated example of the DFP server 100 includes various software modules 101-109 and uses various information 121-128, as discussed in further detail below. The DFP server 100 may also optionally interact with one or more other DFP server programs 105, such as over one or more networks (not shown), and with such optional other DFP server programs 105 providing similar types of functionality to other mobile devices (not shown). In addition, in some embodiments the DFP server 100 may optionally provide one or more application programs 165 that are available for use by mobile devices 150, although in other embodiments some or all such applications may instead be provided by other distinct application server computing devices (not shown) and supported by the DFP server (whether those applications are hosted by the configured computing systems providing the DFP server or by other remote computing systems, such as other game server systems). As discussed below, in some embodiments and situations, some or all of the functionality of the DFP Server 100 is instead provided locally to a group of mobile devices by one or some or all of those mobile devices, such as without any interactions to a separate remote DFP server system, by using DFP client software 155 and corresponding locally stored information (not shown) on those mobile devices.

In the example of FIG. 1A, the DFP server 100 is providing functionality to an example group of multiple client mobile devices 150, such as with respect to distributed execution of an example application (in this example, Application 1 165a)—an embodiment of such a DFP server 100 may further be supporting other groups of mobile devices with respect to the same or other applications, although such other groups are not illustrated with respect to FIG. 1A. In this example, each mobile device 150 includes a copy 161 of at least some of the application A, although in other embodiments may access functionality of an application using only software on the mobile device that is not specific to the application (e.g., a Web browser, not shown)—for example, mobile device 1 150a includes a copy 161a of Application 1 (the copy of Application 1 for client device N 150n is not shown). In addition, each mobile device 150 includes a copy 155 of client software for the DFP server 100, as discussed in greater detail below—for example, mobile device 1 includes a copy 155a of the DFP client software (the copy of the DFP client for client device N 150n is not shown). As discussed below, in some embodiments and situations, some or all of the functionality of the DFP Server 100 is instead provided locally to a group of mobile devices by one or some or all of those mobile devices, such as by using the DFP client software 155 and corresponding locally stored information (not shown) on those mobile devices. In addition, some or all of the mobile devices 150 may further include and/or execute copies of other applications, although such other applications are not illustrated on the mobile devices 150.

In this example, the mobile devices 150 are inter-connected as a virtual or logical group to perform the coordinated and distributed execution of application A, via one or more inter-connections 170 between the various mobile devices 150. In particular, as discussed in greater detail elsewhere, each mobile device 150 is currently connected to at least one other mobile device 150 via one or more connections, with some mobile devices being connected to multiple other mobile devices (e.g., mobile device 3 150c may be connected in a 1-to-1 manner to mobile device N 150n via a first connection, and may separately be connected to both mobile device 1 and mobile device 2 150b via a distinct second connection). Thus, each of the mobile devices 150 includes one or more types of connection capabilities, although local connection capability types (e.g., Bluetooth, Wi-Fi, infrared, wired Ethernet, etc.) are not separately shown in the example of FIG. 1A-FIG. 1B includes additional details about examples of possible types of inter-connections between devices of the group. In addition, mobile devices 1 and 3 each includes capabilities 160 to remotely connect to the DFP server 100 (e.g., 3G wireless, 4G wireless, etc.) via remote connections 180 over one or more networks 190, such as the Internet, one or more cellular networks, etc. While not illustrated in this example, in some situations one or more mobile devices 150 of the group may be connected to one or more other mobile devices 150 of the group via only remote connections 180 (e.g., if mobile device 1 was not connected directly to any other mobile device 150, and instead was only indirectly connected to client device 3 via remote connections 180a and 180c via the DFP server 100), including to optionally have one or more other mobile devices (not shown) that are part of the group but are separated from the illustrated mobile devices 150 via one or more networks 190. Alternatively, in embodiments and situations in which some or all of the functionality of the DFP Server 100 is instead provided locally to a group of mobile devices by one or some or all of those mobile devices, the network 190 and any remote connections 180 may not be present or used. Additionally, in some embodiments, one or more of the client devices 150 may not be mobile (e.g., may be a desktop computer) and/or may be connected to one or more other client devices 150 via a wired connection.

In at least some embodiments, the client mobile devices may include, for example, one or more of the following: a smart phone or other cellular phone, a tablet computer, a slate computer, a PDA ("personal digital assistant"), a laptop or netbook, etc. A non-exclusive list of example types of mobile devices includes the following: an iPhone, an iPad, an iPod Touch, an Android OS ("operating system") device, a Windows Phone OS device, a Kindle Fire device, a Nook Tablet device, a Blackberry device, a Nintendo DS device, a portable Sony PlayStation device, etc. In certain embodiments, the client devices may be GPS-enabled devices containing GPS receivers, and/or may include other location-aware technology such as Wi-Fi location services. Moreover, in at least some embodiments, a particular client device may store various information (whether in a volatile or non-volatile manner), such as relating to the location of the device, including the current location of the device, the location history of the device over a certain period of time, a record of particular Wi-Fi networks with which the device has communicated or which have been available for communication, etc. In addition, various information may be stored relating to the prior activities of the user associated with the device, such as a record of locations that the user has visited. In addition, in some situations, a user may use multiple computing devices at various times, whether serially or simultaneously.

In the example embodiment, the DFP client software 155 on the mobile devices 150 may include at least a subset of the DFP server 100 functionality (e.g., may include local copies of some or all of the modules 101-109), although in other embodiments the DFP client software 155 may instead lack some or all such modules and instead enable interactions between a mobile device 150 and the DFP server 100 so that the modules 101-109 that are part of the DFP server 100 may provide functionality to the mobile device 150 as appropriate. In addition, a particular mobile device may store some or all of the information 121-128 locally to the mobile device, including information specific to the device and its one or more users and its one or more applications.

Automated matchmaking operations may be performed to select a host mobile device 150 to provide a connection to the DFP server 100 in some embodiments and situations, whether operations that are performed in whole or in part by a DFP Server 100 that is remote from the mobile devices 150 and/or operations that are performed in whole or in part by one or more of the mobile devices 150 that are providing functionality of the DFP Server 100 using DFP client software 155. For example, the DFP client software 155a on mobile device 1 may have previously established remote connection 180a with the DFP server 100, and/or the DFP client software 155c on mobile device 3 may have previously established remote connection 180c with the DFP server 100, and if so the manager module 101 of the DFP server 100 may perform the automated matchmaking operations. In particular, in this example the mobile device 1 and mobile device 3 may be candidates to serve as an initial current host for the group based on their respective remote network connectivity capabilities 160, optionally along with one or more other mobile devices 4 through N−1 (not shown), and thus the matchmaking operations may select one of those candidate mobile devices. In this example, mobile device 3 is illustrated as having been selected to act as a current host for the group of devices 150 (as highlighted in bold, and being labeled the "Group Host"), with established remote connection 180c with the DFP server 100 providing connectivity between the group and the DFP server 100. In some embodiments, established remote connection 180*a* between non-host mobile device 1 and the DFP server 100 may not be used for group operations (e.g., optionally may be closed) while mobile device 3 acts as the host for the group, while in other embodiments the established remote connection 180*a* may continue to be used in various manners (e.g., to provide functionality to mobile device 1 that is not related to group activities; to perform group-related communications, such as in a distributed manner with mobile device 3 and/or as a backup to mobile device 3; etc.).

After the selection of a group host device is made, the DFP server 100 may notify the DFP client software 155 on one or more of the mobile devices of the group (e.g., the DFP client software 155 on the selected host), and the DFP client software 155 on the selected host may perform further operations to convey information between the DFP server 100 and/or an application server (not shown) and the mobile devices of the group. Such application-specific information may in some situations include information from other storage 128, such as application-specific content to be provided to users, application-specific data generated by users, other application-specific state for particular applications and groups, etc. Other storage 128 may further store other types of information, including information specific to particular users (e.g., photos, social networking posts, social networking profile messages, etc.), available types of content (e.g., audio clips or files, video files, images, etc.); etc. In addition, in at least some embodiments, the manager module 101 of the DFP server 100 (or similar functionality of the DFP client software 155) may provide functionality to coordinate or provide a distributed canvas display among the mobile devices of the group, although in other embodiments the Application 1 may perform some or all such activities.

Figure 1B:
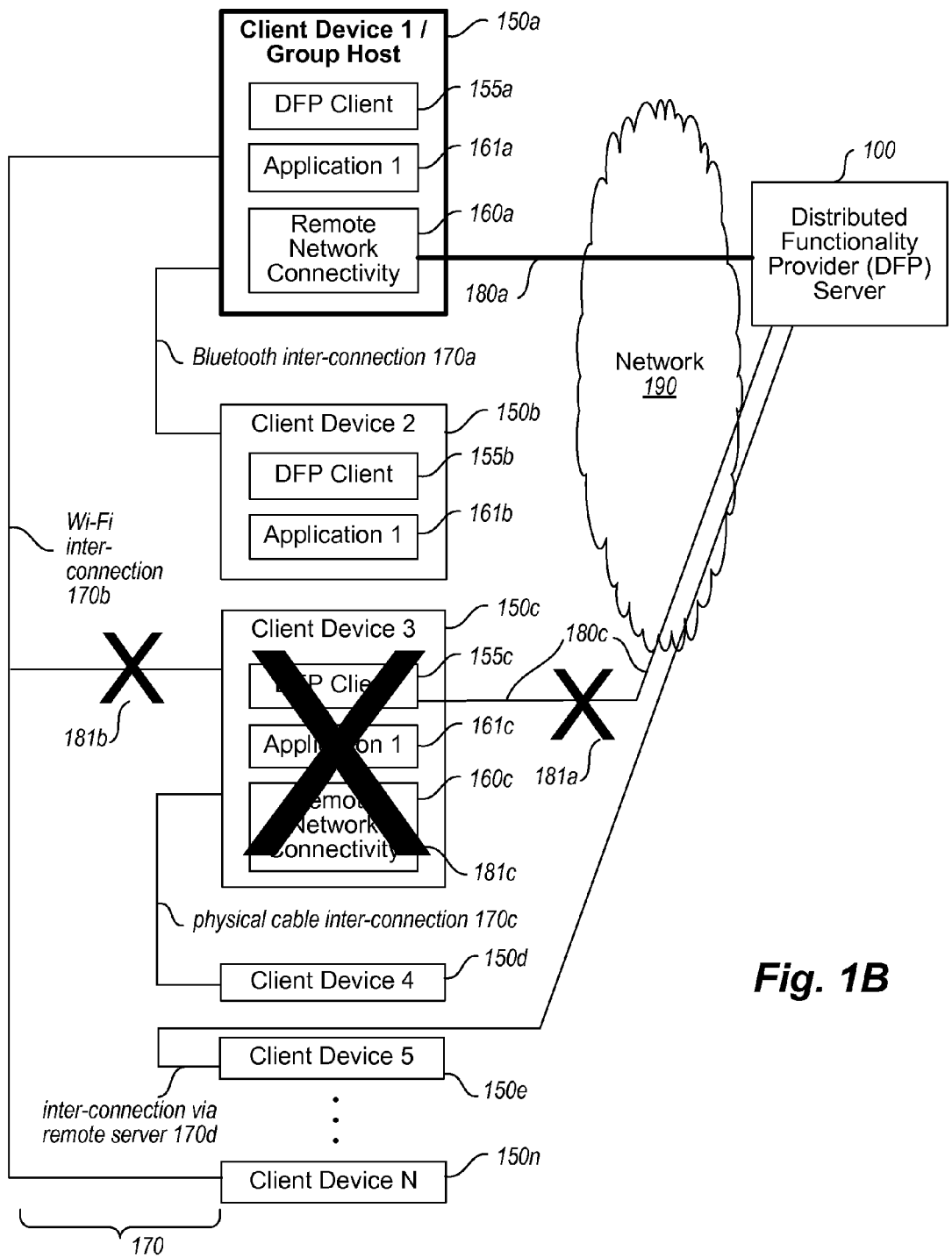
Figure 1C:
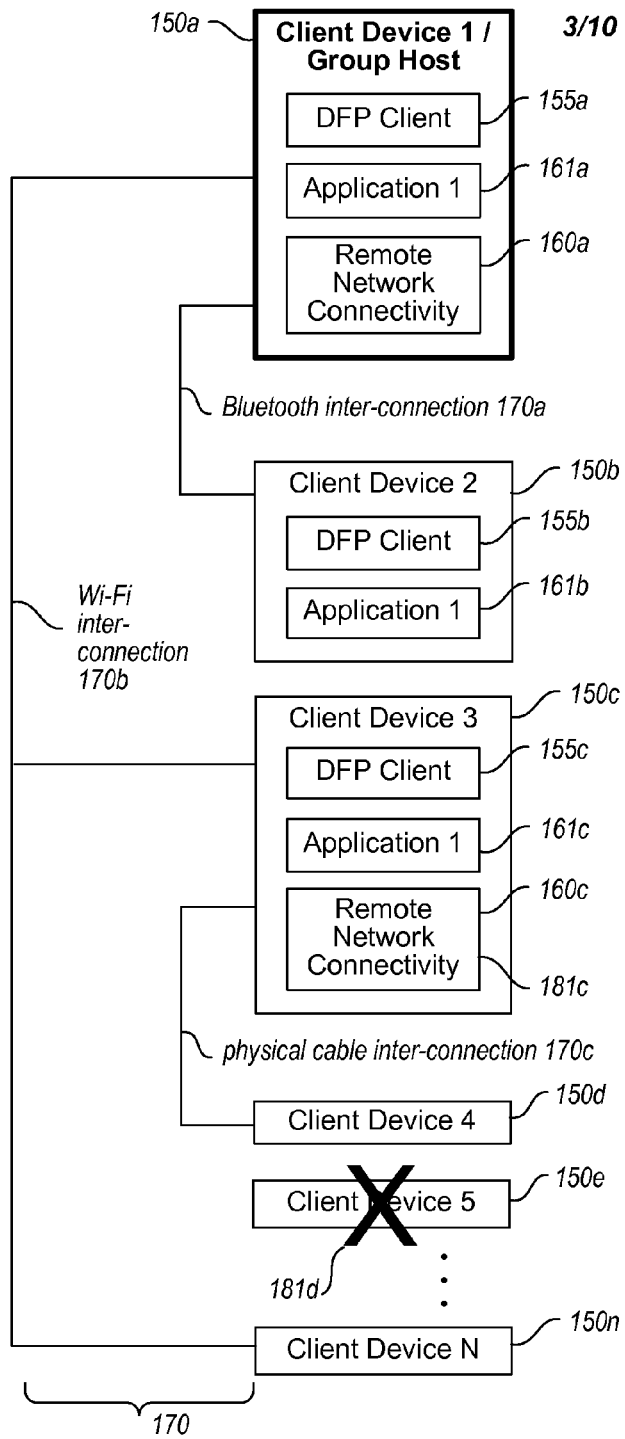

In other embodiments, if no remote connections 180 between the mobile devices of the group and the DFP server 100 exist at a time of performing automated matchmaking operations, or based on other configuration of the DFP client software 155 on one or more of the mobile devices of the group, the DFP client software 155 on one or more of the mobile devices of the group may instead perform such automated matchmaking operations, such as temporarily until the DFP server 100 is available to make a regular host selection, or instead in place of the DFP server 100. FIG. 1C includes additional details related to examples of such client-side automated matchmaking operations. Such client-side automated matchmaking operations may include, for example, using locally stored information (not shown) on one or some or all of the mobile devices 150 of the group, such as to correspond to some or all of the information 121-128—since such locally stored information may be less complete in at least some respects than information available to the DFP server 100, a host selection made locally by the DFP client software 155 may be temporary until the DFP server 100 is available to make a selection based on other such information 121-128. Such client-side automated matchmaking operations may further include, for example, one of the DFP client software copies performing the operations (e.g., after being elected by other DFP client software copies as a current leader, or otherwise being selected or configured to act as a current leader), or by multiple of the DFP client software copies performing the operations in a distributed manner. During times when no remote connections 180 between the mobile devices of the group and the DFP server 100 exist, the DFP client software 155 and/or local application copies 161 may nonetheless continue to provide at least some functionality of the application to the group, and may further locally store information on one or more of the mobile devices 150 about output generated, activities performed and other current status information—if so, when a host (or optionally any member of the group) is later able to establish a remote connection 180 to the DFP server 100, some or all such locally stored information may be sent to the DFP server 100 to enable update of the information 121-128. As one example, information about performance of particular users within the application may be stored as part of leaderboard information 127, such as for a game application. In other embodiments, no remote DFP Server 100 may be provided, and all functionality of the DFP Server 100 may instead be provided by the mobile devices of the group using the DFP client software 155.

As previously noted, functionality of the DFP server system (whether provided via one or more remote computing systems and/or by the mobile devices of the group) may use various types of information when performing automated matchmaking operations, such as to select one or more host devices from a current group of multiple devices and/or to select particular devices to participate in a group (e.g., to add to an existing group, to use to create a new group, etc.). For example, the DFP server 100 may have stored various information 121-128 regarding the mobile devices 150, their users, their locations and the application in use, such as based on previous registration activities and/or interactions with the DFP server 100, and may use such information as part of performing the automated matchmaking operations. Such information may be stored in, for example, one or more of the following: device profile information 122 (e.g., device hardware type; device OS type; device software, such as application programs, libraries, utilities, etc.; device capabilities, such as connection type(s), processing power, memory amount and type, storage amount and type, etc.; device status, such as current battery level and connection strength; etc.); user profile information 121 (e.g., account information; activity patterns, such as how long a user has played a particular application or applications generally on average in the past; user preferences, such as whether the user is willing to allow his or her device to serve as a host; social network information, such as information about friends and followers; prior activities of the user, such as whether he or she has acted as a watcher or spectator to an application, by receiving access to at least some of a distributed canvas GUI display functionality for the application without being able to modify or affect the performance of the application; etc.); application profile information 123 (e.g., information about levels, a textual description, types of data usage patterns during application execution, etc.); location information 124 (e.g., current location, such as expressed in latitude and longitude and optionally bearing or heading and optionally altitude; a history of past locations, such as to reflect a previously traveled path; etc.); etc.

In addition, in at least some embodiments, the DFP server 100 may gather some or all such information to be used in automated matchmaking operations and include it as part of separate matchmaking information 125, such as to facilitate rapid access to particular information of use, to track current hosts that have been selected, to track previous hosts that have been selected, to track current alternative candidates for hosts for particular groups, etc.)—the matchmaking information 125 may further include additional information specific to the automated matchmaking operations, such as information about particular factors that are configured to be used (e.g., for all groups and applications, for particular applications, for particular groups, etc.), information about how to combine particular factors (e.g., ways to weight or otherwise combine information may multiple factors), information about when to perform automated matchmaking operations (e.g., upon request, upon a change in a currently selected host that prevents that mobile device from continuing to act as a host, upon other defined criteria, etc.), etc., and with particular such information being specified for an application by the application provider and/or by a distinct operator of the DFP Server 100 functionality, or being specified for multiple applications (e.g., all applications) by a distinct operator of the DFP Server 100 functionality.

As one specific example in which a group of multiple mobile devices selects a host device without using a remote DFP Server 100, the selection may be made without consideration of any remote connections by the mobile devices to remote server computing systems and/or without consideration of remote network connectivity capabilities—instead, the selection may be made by one or more of the mobile devices based on one or more of the following types of factors: capabilities of the selected host mobile device (e.g., processing speed, network transmission speed to other mobile devices of the group via local inter-connections, etc.); information about the selected host mobile device relative to other mobile devices of the group (e.g., relative location, such as to select a centrally located device based on distance to other of the mobile devices; orientation, such as to select a location of the host device so that some or all of the other mobile device users face that host device, possibly to allow those users to see each others' displays as part of a distributed canvas display functionality; etc.); information about the user of the selected host mobile device (e.g., willingness of the user to use the mobile device to act as the host; past behavior of the user in remaining as a host until an application is completed or otherwise remaining in groups for long or short periods of time; a preferred status of the user, such as to enable users who have reached a preferred status or level within an application or with respect to the DFP Server system to have the first opportunity to act as a host and receive corresponding benefits that are provided; etc.); etc. In other situations, some or all of these types of factors may instead be considered in situations in which a remote DFP Server 100 is used and/or the host selection is made based in part on consideration of remote connections by the mobile devices to remote server computing systems and/or of corresponding remote network connectivity capabilities.

In some embodiments and situations, the automated matchmaking operations may further use analytics information, which includes information of various types corresponding to different types of events of interest that occur—at least some of the information may correspond to or reference, for example, user profiles 121, device profiles 122, application profiles 123 and location information 124. For example, an application may provide information about a variety of types of events (e.g., application start, application end, application phase or stage start or end, particular user action, particular group achievement, etc.), with the information being of various types. In addition, the various modules 101-109 may perform various analyses of the analytics information, such as to perform data mining or otherwise determine patterns from or other aggregations of multiple events, and resulting information that is generated may be stored in various manners (e.g., in other storage 128, as other analytics information 126 events, etc.). A non-exclusive list of types of information that may be stored for an event includes the following: a particular activity; one or more users (e.g., via a unique user ID), such to enable corresponding information to be accessed from the user profiles 121; one or more devices (e.g., via a unique device ID), such to enable corresponding information to be accessed from the device profiles 122; a particular application (e.g., via a unique application ID), such to enable corresponding information to be accessed from the application profiles 123; a location (e.g., via a set of location coordinates or other information that uniquely identifies a location), such to optionally enable corresponding information to be accessed from the location information 124; a state of the application (e.g., a current stage, level, group score, etc.); one or more application-specific tags (e.g., text or other information that is meaningful to the application); etc.

In the illustrated example, the initial host selection for the group has selected mobile device 3 to act as the host, such as to use remote connection 180c to provide application-related capabilities to other mobile devices of the group from one or more remote computing systems. The initial host selection may be made, for example, based on one or more of the following factors: remote connection 180c being preferred to remote connection 180a, such as based on it having higher bandwidth, lower latency, lower monetary cost of use, greater reliability or stability (e.g., less likely to have lost packets or dropped connections), etc.; mobile device 3 being preferred to mobile device 1, such as based on it having faster computing capabilities and/or greater computing-related resources, greater reliability or stability (e.g., less likely to fail; more likely to operate longer, such as based on battery life remaining; etc.), etc.; the user of mobile device 3 being preferred to the user of mobile device 1, such as based on being expected to remain as part of the group for longer; etc. If it is later determined to change hosts (e.g., based on mobile device 3 shutting down or leaving the group), mobile device 1, for example, may be selected at that time to replace mobile device 3 as the current host, such as based on mobile device 1 being the only remaining group device with a remote connection 180 to the DFP server 100 and/or other remote computing systems, or based on performing the same type of selection process as for the initial selection between multiple candidate hosts. FIG. 1B includes additional details related to an example of changing hosts for the group.

In addition, in some embodiments a particular mobile device and a particular group may be matched (e.g., if multiple alternative groups are available for that mobile device) based on consideration of one or more factors that may include some or all of the same factors as discussed above with respect to host selection. Furthermore, in some embodiments, such matching may be performed to increase or decrease diversity of particular types of mobile devices and/or device capabilities within a group, such as to combine multiple devices of the same or similar types (e.g., devices that have the same or similar capabilities) to enable different users to receive the same or similar user experience, and/or to provide a group with a device having preferred capabilities (e.g., to add a device having remote network capabilities to a group that lacks such capabilities in some or all of its current members).

As one specific example of interactions that may occur, mobile device 1 may be an iPhone device that has 3G wireless remote connectivity capabilities 160a and also Wi-Fi wireless local connectivity capabilities, and mobile device 2 may be an iPod Touch device that has only Wi-Fi wireless local connectivity capabilities. The user of mobile device 1 (referred to as "User A" in this specific example) may invite the user of mobile device 2 (referred to as "User B" in this specific example) to participate in chat activities using an application with corresponding capabilities (e.g., APNS, or "Apple Push Notification Service", capabilities), and User B accepts and joins a corresponding chat room with User A. Subsequently, User A launches Application 1 on mobile device 1, and then navigates to a friends list provided by Application 1 and locates User B. User A then toggles a button provided by Application 1 that looks like a chat bubble, to indicate to send an invitation to chat with User B. Application 1 then sends a notification to User B indicating that User A has requested to chat with User B. Using the Wi-Fi connection on mobile device 2, User B accepts User A's request, and taps a button that launches Application 1 and that performs automated matchmaking operations for User A and User B based on User A's request to chat. The result of the matchmaking operations is to select mobile device 1 as the current host, such as because User A initiated the request, and mobile device 2 acts as a client of mobile device 1. As a second specific example of interactions that may occur, a user of one of the mobile devices could have the mobile device with him or her without currently using it (e.g., it is in a pocket or holster), but the mobile device could nonetheless be part of a group, including to act as a host for the group (e.g., without the user's current knowledge, such as based on previous approval given by the user for the mobile device to be used in such a manner)—if so, the user may receive benefits (e.g., monetary fees, "points" within an application or for the DFP Server, etc.) for providing a hosting server that others can use. Such functionality enables the providing of computing connectivity and services for a fee, leveraging payments and transacting based upon digital goods/currency, while the owner is not even paying attention and/or is using other applications on their mobile device.

In the illustrated embodiment, the Manager Module 101 may perform automated operations to provide both matchmaking functionality (including group host selection functionality) and distributed canvas GUI display functionality (and optionally additional types of functionality), while in other embodiments two different modules may be used that each provide only one of the matchmaking functionality and distributed canvas GUI display functionality, and in yet other embodiments one or both of the matchmaking functionality and distributed canvas GUI display functionality may not be provided by the DFP Server system (or only portions of such functionality may be provided, such as only one of group host selection and other types of matchmaking functionality).

In addition to the operations of module 101, the DFP Server 100 may further in some embodiments include one or more additional modules 103-109. In the illustrated embodiment, the additional modules include an advertisement server module 103 that may provide advertisements for display or other presentation on particular mobile devices 150 at particular times, including in conjunction with particular applications (e.g., at particular locations within an application; at particular times within an application, such as upon request by the application for display at a particular part of the application functionality; etc.)—such advertisements may, for example, be stored as part of the other storage 128 or instead on other remote storage (not shown) and/or may be served from one or more remote ad server systems (e.g., an ad server system provided by an operator distinct from the operator of the DFP Server system), and may be selected in various manners (e.g., using some or all of the information 121-128 to personalize or otherwise direct particular advertisements to particular recipients and situations). While different users and mobile devices within a group may receive different advertisements in a particular embodiment and situation, in other embodiments and situations a single advertisement may be sent to some or all mobile devices within a group.

In the illustrated embodiment, the additional modules also include a messaging server module 105 that may be used to send messages to particular mobile devices and/or all mobile devices within a group, such as from the DFP Server 100 and/or from a particular application. As one example, a third-party application owner or provider distinct from an operator of the DFP server may request that a specified message be sent to all current and/or prior users of the application, such as to provide promotional content related to that application or to other products or services (e.g., another application from that application owner or provider).

In the illustrated embodiment, the additional modules also include a payment module 107 that may be used to exchange payments with users and/or with application owners or other providers. For example, users may be charged various fees by application providers and/or may be charged various fees by the DFP Server 100 for particular functionality that it provides, and if so the payment module 107 may be used to obtain those fees (e.g., one-time fees, on-going subscriptions, usage-based fees, etc.).

In the illustrated embodiment, the additional modules may also optionally include one or more other modules 109 that may be used to provide other types of functionality of interest. As one example, a third-party application owner or provider distinct from an operator of the DFP server may request that a specified message be sent to all current and/or prior users of the application, such as to provide promotional content related to that application or to other products or services (e.g., another application from that application owner or provider).

FIG. 1B continues the example of FIG. 1A, and includes additional details regarding an example of matchmaking operations that are performed to select a new host device for the group of mobile devices based on one or more types of changes that may occur. In addition, various details are illustrated with respect to examples of inter-connections 170 that may exist between various of the mobile devices of the group, while some details shown in FIG. 1A are not included in FIG. 1B for the sake of simplicity (e.g., information about modules 101-109, applications 165, other optional DFP Servers 105, stored data 121-128, etc.).

With respect to the additional details illustrated in FIG. 1B corresponding to possible types of inter-connections 170 between the mobile devices of the group, FIG. 1B illustrates one possible example of types of inter-connections that might be present and in use. In particular, in this example, various of the client devices include Wi-Fi-based inter-communication capabilities and are interconnected via a Wi-Fi connection 170*b*, including client devices 1, 3, and N. Furthermore, in this example, client device 2 150*b* includes inter-communication capabilities that include only use of the Bluetooth networking protocol, and thus participates in the group based on a Bluetooth-based inter-connection 170*a* between client device 2 and client device 1 150*a* (such as if client device 1 is the only other device of the group with Bluetooth capabilities that is within a sufficient proximity to client device 2 to enable such an inter-connection). Thus, during the time that client device 3 acts as the host for the group, group host client device 3 sends group-related communications to client device 2 through client device 1 as an intermediate pass-through device, using inter-connection 170*a* (and also inter-connection 170*b* and/or inter-connections 180*a* and 180*c*). In a somewhat analogous manner, an additional example client device 4 150*d* is illustrated in FIG. 1B, which in this example does not include any wireless inter-communication capabilities—instead, client device 4 participates in the group in this example via a physical cable inter-connection 170*c* to client device 3. Thus, during the time that client device 3 acts as the host for the group, group host client device 3 sends group-related communications to client device 4 via that physical cable for inter-connection 170*c*. Client device 5 150*e* is also newly illustrated in FIG. 1B, and in this example does not include any local wireless inter-connection capabilities such as Bluetooth or Wi-Fi, but does support remote wireless connection capabilities (e.g., via a 3G or 4G wireless cellular connection). Accordingly, in this example, client device 5 participates in the group via an inter-connection 170d using one or more remote servers (e.g., the DFP Server 100) as intermediate devices, such that group host client device 3 sends group-related communications to client device 5 via the remote servers as pass-through devices. Thus, some devices may support multiple types of inter-connection capabilities (e.g., client device 1, which supports Bluetooth, Wi-Fi, and a remote network connection), while other devices may support only a single type of inter-connection capability.

FIG. 1B further illustrates an example of actions that may be taken to select a new device of the group to act as the host for the group based on one or more types of changes that occur. In this example, the types of changes discussed occur with respect to the device of the group that was the current host before the changes (in this example, client device 3), although in other situations one or more types of such changes may occur with respect to one or more other devices in the group, whether instead of or in addition to the device that was the current host device before the changes.

In particular, in this example, one type of change that may occur is for the client device 3 to lose its ability to communicate with the DFP Server 100, as shown by indicator 181a, such as due to a problem with transmitter hardware and/or software of client device 3, due to problems external to client device 3 (e.g., a third-party service provider that supports the remote connection 180c, such as a particular cellular telephone network provider), due to client device 3 moving to a location that lacks support for the remote connection 180c, etc. If that is the only type of change, client device 3 may continue to participate in the group via the Wi-Fi inter-connection 170b, although communications between the group and the DFP Server 100 (or any other remote servers) will need to occur in a manner other than the prior connection 180c, such as to instead use connection 180a.

Another type of change that may occur is for client device 3 to lose its ability to participate in the Wi-Fi inter-connection 170b, as shown via indicator 181b, but continue to have an existing connection 180c to the DFP Server 100 (e.g., due to a problem with transmitter hardware and/or software of client device 3, due to client device 3 moving to a location outside of range of inter-connection 170b, etc.). If so, client device 3 may continue to participate in the group via the remote connection 180c, in a manner similar to that described with respect to client device 5 and inter-connection 170d. In addition, with either of the changes of type 181a or 181b, if only one of the changes has occurred, client device 4 may also continue to participate in the group via the physical cable inter-connection 170c, by continuing to receive group-related communications via client device 3. Furthermore, while client device 3 continues to participate in the group, client device 3 may in some situations continue to be the group host device, while in other situations may no longer be selected as the group host after the change(s).

Yet another type of change that may occur is illustrated with indicator 181c and corresponds to client device 3 no longer participating in the group. Such a change may be caused by, for example, client device 3 having a failure or otherwise shutting down (e.g., due to a lack of sufficient battery, due to an instruction from its user, etc.). Alternatively, the change 181c may instead be caused by client device 3 leaving a geographic location used for some or all of the devices of the group, the user of client device 3 indicating to stop participating in the group, a shutdown of software modules 155c and/or 161c on client device 3, or any other situation that causes the device to no longer be part of the group. If so, and even if one or both of connection 180c and the ability to use Wi-Fi inter-connection 170b remains, client device 3 will be removed from ongoing operations of the group. In addition, in this example, client device 4 will similarly be removed from participation in the group, since its only current connection to other devices of the group was via client device 3, although in some situations client device 4 may be able to rejoin the group if it is able to establish a new connection to one or more other devices of the group.

In this example, based on any of the changes 181a-181c occurring, matchmaking operations are performed to select a current host for the group for ongoing operations, while in other embodiments only a change of type 181c may cause such group host selection matchmaking operations to occur. While in some situations the matchmaking operations may determine to retain the same device of the group that was previously the host, in this example the matchmaking operations include selecting client device 1 to be the new host for the group for ongoing operations, such as to continue an ongoing interaction session with the DFP Server 100. As discussed in greater detail elsewhere, such matchmaking operations may in some embodiments and situations be performed only by the DFP Server 100, may be performed by interactions of some or all of the client devices of the group, or may be based on actions of the DFP Server 100 in combination with that of one or more devices 150 of the group. Furthermore, as discussed in greater detail elsewhere, one or more of a variety of factors may be used when determining to select client device 1 to act as the new group host, including the existence of its remote connection 180a to the DFP Server 100 and/or other capabilities or configuration associated with client device 1.

FIG. 1C continues the examples of FIGS. 1A and 1B, but provides additional details involving an embodiment in which multiple devices of the group interact without the use of any remote servers. Such a situation may occur, for example, if the group was initially interacting with DFP Server 100 (e.g., being controlled by DFP Server 100), such as in the examples of FIGS. 1A and 1B, and the ability to interact with the DFP Server 100 is lost (e.g., the DFP Server 100 is shut down or otherwise becomes unavailable, all of the remote connections via the network 190 to the DFP Server 100 become unavailable, etc.). If so, the group may continue its prior operations, whether on a temporary basis until connections to the DFP Server 100 are reestablished, or indefinitely. Such ongoing operations may include the previously existing host device (in this example, client device 1) taking over the prior role of the DFP Server 100 in directing operations of the group, such as to provide some or all of the functionality that would previously or otherwise have been provided by the DFP Server 100. Alternatively, in some embodiments and situations, such a change in the ability to interact with a remote DFP Server 100 may initiate matchmaking operations in which a new host device for the group may optionally be chosen, such as based at least in part on factors other than the existence of a remote connection to the DFP Server 100 that no longer exists. In yet other situations, the operation of the group without any remote servers may instead occur throughout the entire existence of the group, such as if the group was formed and operates without ever interacting with such a remote server. It is noted that in this example, if remote connections to DFP Server 100 are not available, client device 5 will not be able to participate in activities of the group, since its only connection to the group previously was via such a remote connection.

It will be appreciated that various of the details provided in FIGS. 1A-1C are illustrative, and that other types of functionality may be provided in other manners in other embodiments.

Figure 3A:
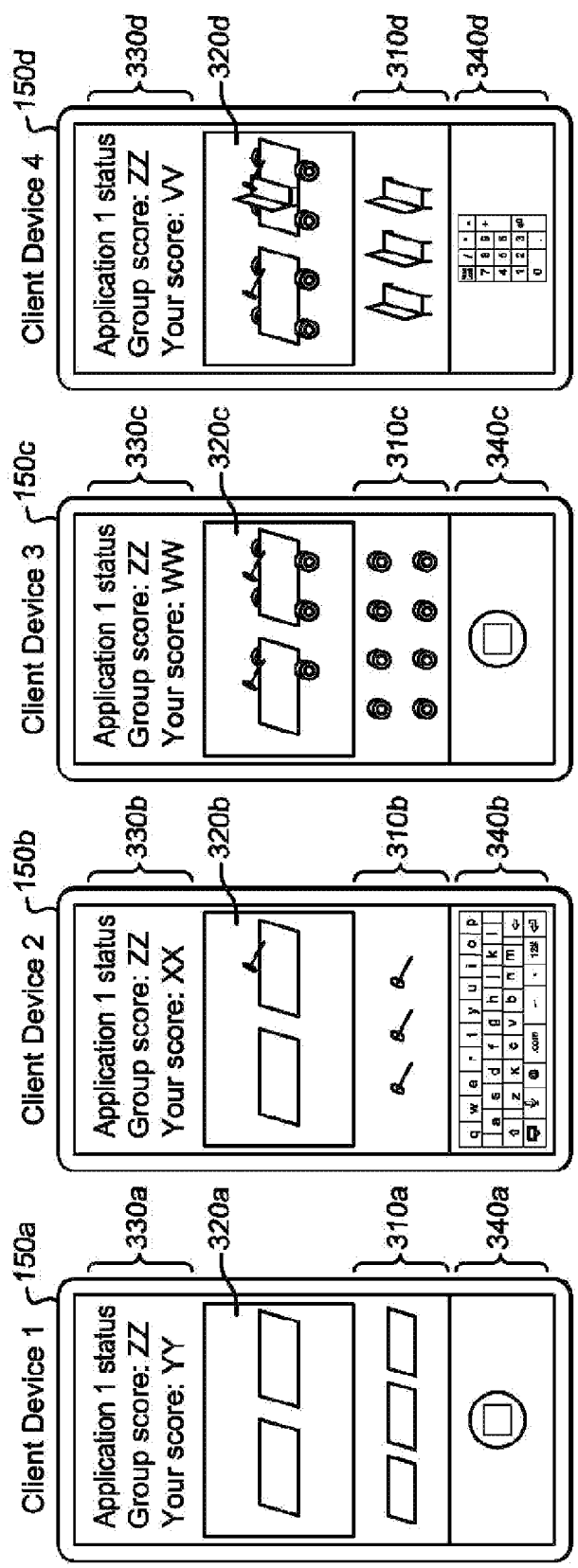
FIGS. 3A and 3B illustrate examples of using multiple interconnected mobile devices together in particular distributed manners.
Figure 3B:
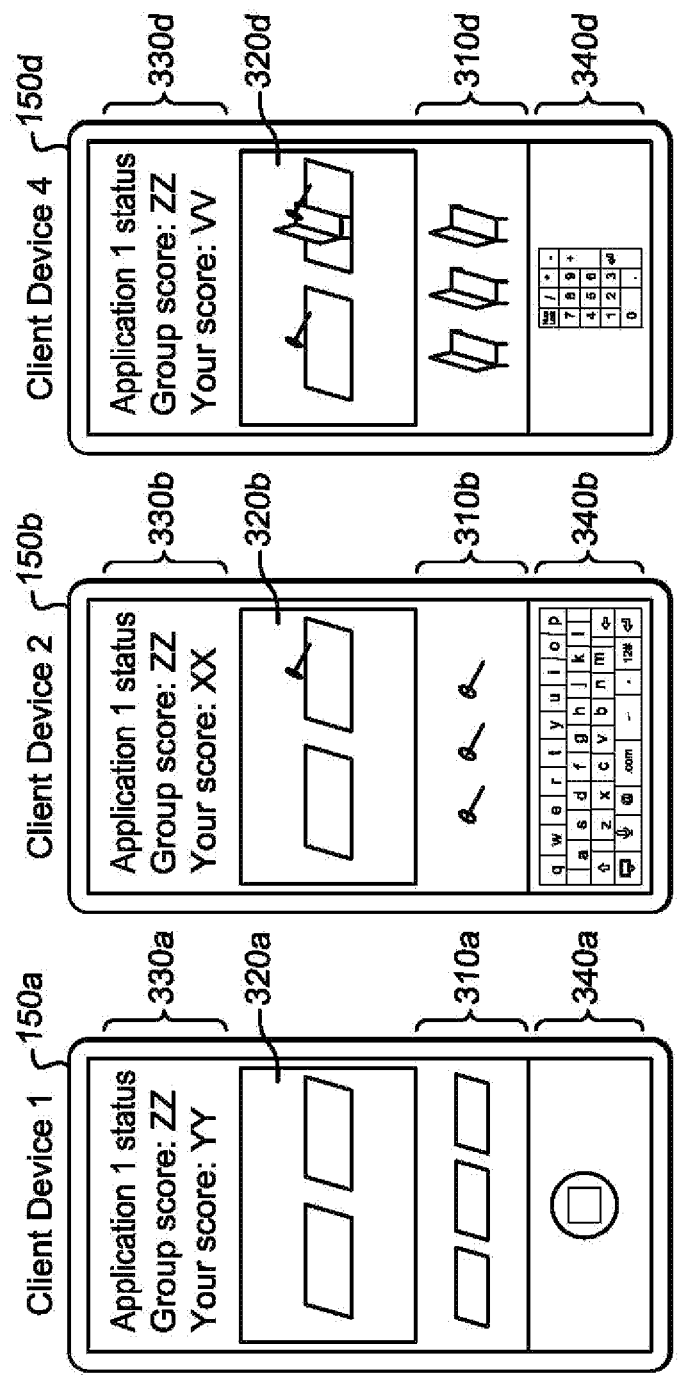

FIGS. 3A and 3B illustrate examples of using multiple interconnected mobile devices together in particular distributed manners. For example, as a continuation of the examples discussed with respect to FIGS. 1A-1C, four mobile devices 150 are included as part of a group that is participating in a coordinated execution of Application 1 in a distributed manner. In this example, the four mobile devices may be of different types, such as to have different sizes and capabilities (e.g., different hardware interaction controls 340), but each device includes a display area that in this example is substantially all of the visible portion of the device.

In the example of FIG. 3A, the four mobile devices 150 are using distributed canvas display capabilities being coordinated by the DFP Server, with each device showing a distinct portion of a graphical user interface ("GUI") of Application 1. While the four mobile devices 150 are illustrated in a side-by-side manner, the user of each device may be able to view only the GUI shown on his or her device, with some or all of the mobile devices 150 optionally being located remotely from each other or otherwise positioned in a way that is not visible to the users of the other devices. In the example of FIG. 3A, Application 1 is a game that allows different users to cooperatively build different portions of toy vehicles that are traveling along a conveyor belt 320 displayed in the GUI that moves from left to right across the GUIs of mobile devices 150a, 150b, 150c and 150d in order, and with the group receiving points for how accurately and quickly they build copies of the vehicles, and with each user separately receiving points or a score corresponding to that user's performance within the game. Current example game and user status information 330a is shown in each mobile device's portion of the GUI, in a manner that is at least partially specific to the user of that mobile device, and with such status information enabling leaderboard information to be tracked for the game.

Thus, in this example, the user of mobile device 1 may repeatedly select a vehicle chassis (shown in this example as a rectangle) from a storage bin section 310a of the portion of the distributed canvas GUI shown on the display of device 1, and place the selected vehicle chassis on the portion 320a of the conveyor belt displayed on the GUI portion on mobile device 1, such as by using a drag-and-drop action on a touch-sensitive screen of mobile device 1. In this example, the user of mobile device 1 has currently placed two vehicle chasses on the portion 320a of the conveyor belt, and has previously placed other vehicle chasses on the conveyor belt that have since moved to the right and are now displayed on one of the other portions 320b, 320c and 320d of the conveyor belt. In this example, the user of mobile device 2 similarly adds a steering wheel to each vehicle chassis on the conveyor belt portion 320b from a storage bin section 310b of portion of the distributed canvas GUI shown on the display of device 2, the user of mobile device 3 similarly adds four wheels to each vehicle chassis on the conveyor belt portion 320c from a storage bin section 310c of the portion of the distributed canvas GUI shown on the display of device 3, and the user of mobile device 4 similarly adds a front seat to each vehicle chassis on the conveyor belt portion 320d from a storage bin section 310d of the portion of the GUI shown on the display of device 4. It will be appreciated that other variations and types of games may be used in other embodiments—as one example, if the placement of wheels takes longer than other tasks, two different users and mobile devices may receive the same or substantially similar portions of the GUI, such that they both see the conveyor belt portion 320c and a storage bin section 310c of the GUI, and can perform the same types of tasks on the same or different vehicle chasses. In addition, other users may be performing other tasks at other earlier or later portions of the conveyor belt that are not displayed in this example.

As previously noted with respect to FIGS. 1A-1C, mobile device 3 was initially selected to be the host for the group of mobile devices 150, and the display of FIG. 3A corresponds to that time while device 3 is the group host, although its status as host in FIG. 3A may be unknown to some or all of the users of the mobile devices 150. As part of that role, device 3 may have been receiving information from a remote game server system (e.g., content to display on the GUI portions 320a-320d) and forwarding corresponding instructions on to each of the other group devices, receiving information from a remote embodiment of the DFP Server 100 (e.g., instructions to coordinate the distributed execution of the application) and similarly forwarding corresponding instructions to other group devices, providing information to the remote game server system (e.g., information about a current status of the game, actions of the users, etc.) that is initiated or generated on device 3 and/or received from other of the group devices, and/or providing information to the DFP Server 100 (e.g., application state information, device state information, etc.) that is initiated or generated on device 3 and/or received from other of the group devices.

FIG. 3B continues the example of FIG. 3A, but illustrates the dynamic modification functionality of the distributed canvas GUI display capabilities. In particular, in the example of FIG. 3B, mobile device 3 has left the group, and the distributed canvas GUI display for the game is dynamically modified to accommodate the current 3 devices that are part of the group. In addition, mobile device 1 dynamically takes over the host functionality for the group, and may begin to perform any of the activities previously performed by mobile device 3, including interactions with the remote game server system and/or remote DFP Server 100 and/or including sending directions to other group devices related to what game-related information to display, although the switch to use of mobile device 1 may be transparent to some or all of the users of the mobile devices 150, such that the current host continues to be unknown to those users. With respect to the dynamic modification to the distributed canvas GUI display for the game, in this example the user of each mobile device continues to perform the same type of actions as before, but with the activity of adding wheels to the vehicle that was previously performed by mobile device 3 being currently removed from the group activities for the game. As an alternative, the users of mobile devices 1 and 2 could instead have continued to perform the same types of activities, but the user of mobile device 4 could have had his or her activities changed to perform the activity of adding wheels to the vehicle that was previously performed by mobile device 3, with the display of mobile device 4 being updated to reflect that previously displayed to mobile device 3, and with the activity of adding seats being removed from the game. As another alternative, all of the users could have had their activities changed in one or more manners, or the game operations could be modified to automatically add wheels to the vehicle chasses (e.g., before or after each chassis is added to the conveyor belt).

Accordingly, in the example of FIGS. 3A and 3B, the DFP Server 100 supports the dynamic modification of distributed activities of the group in executing the current application, including to dynamically perform new matchmaking activities to select a new host for the group, and to dynamically coordinate modifications to the distributed canvas display capabilities being provided. As previously noted, the dynamic modification of distributed activities of the group in executing the current application may be performed in whole or in part by a DFP Server 100 that is remote from the mobile devices 150 and/or may be performed in whole or in part by one or more of the mobile devices 150 that are providing functionality of the DFP Server 100 using DFP client software 155.

It will be appreciated that various of the details provided in FIGS. 3A and 3B are illustrative, and that other types of functionality may be provided in other manners in other embodiments.

Figure 2:
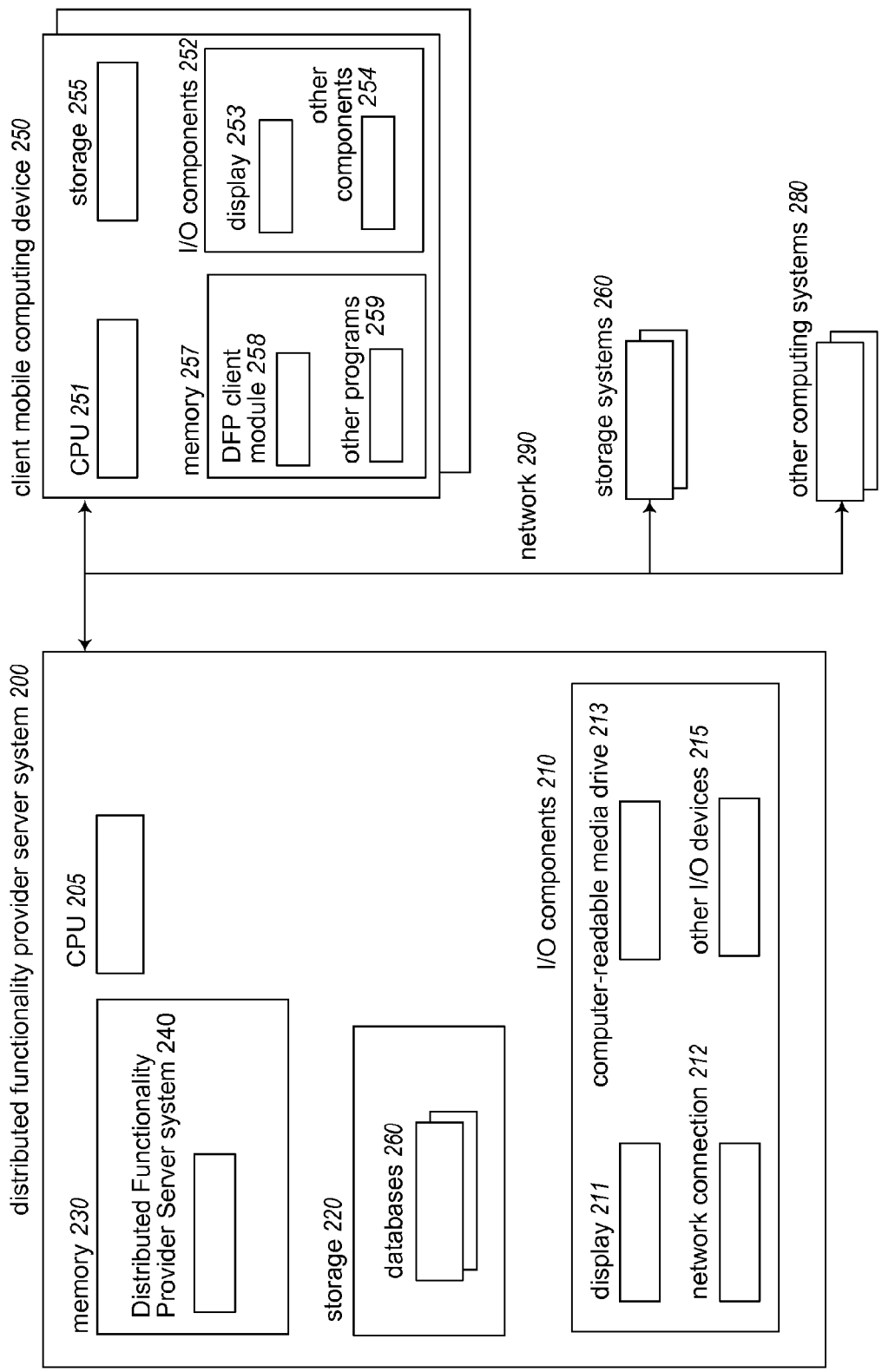
FIG. 2 is a block diagram illustrating example computing systems suitable for executing an embodiment of a system for coordinating interconnection and use of multiple mobile devices together in a distributed manner.

FIG. 2 is a block diagram illustrating example computing systems suitable for executing an embodiment of a system for coordinating interconnection and use of multiple mobile devices together in a distributed manner. In particular, FIG. 2 illustrates a distributed functionality provider server system 200 suitable for executing an embodiment of a DFP Server system 240 that facilitates interactions between various mobile computing devices 250 over a network 290, such as by providing functionality of the DFP server 100 of FIGS. 1A-1C. The network 290 may include publicly-accessible networks such as the Internet and/or the World Wide Web, and may also include one or more private networks, such as private cellular telephone networks or private local-area networks ("LANs"). While not illustrated here, in some embodiments the distributed functionality provider server system 200 may include multiple computing systems, some or all of which may be co-located or otherwise associated, while others of which may be located remotely from other computing systems within the distributed functionality provider server system. In addition, while not illustrated here, various modules of the DFP Server system 240 may be present and used in at least some embodiments, as discussed with respect to FIGS. 1A-1C and elsewhere.

In the illustrated embodiment, the distributed functionality provider server system 200 has components that include one or more CPU processors 205, various I/O components 210, storage 220, and memory 230. The illustrated I/O components include a display 211, a network connection 212, a computer-readable media drive 213, and other I/O devices 215 (e.g., a keyboard, a mouse, speakers, etc.). In addition, the mobile computing devices 250 and/or other computing systems 280 may also each include similar components to some or all of the components illustrated with respect to distributed functionality provider server system 200, but at least some such components are not illustrated in this example for the sake of brevity. For example, the illustrated client mobile computing devices 250 may each have one or more CPU processors 251, I/O components 252 such as a display device 253 and other components 254, storage 255, and memory 257. In the illustrated embodiment, a client DFP software module 258 is executing in memory 257, along with one or more optional other programs 259 (e.g., corresponding to one or more applications).

An embodiment of a DFP Server system 240 is executing in memory 230, and it interacts with client mobile computing devices 250, and optionally other computing systems 280 and/or storage systems 260 over one or more of the networks 290. The other computing systems 280 may, for example, provide applications, application functionality and/or content to mobile computing devices, such as in a manner coordinated by the system 240. The system 240 may create and/or use various information during operation, such as information 121-128 of FIGS. 1A-1C, which may be stored in one or more database data structures 260 on storage 220 and/or on one or more remote storage systems 260. The system 240 may include various software instructions that are executed by the system 200, such as to program or otherwise configure the CPU processor(s) 205 to perform particular functionality of the described techniques. Similarly, the module 258 may include various software instructions that are executed by each of the devices 250, such as to program or otherwise configure the CPU processor(s) 251 to perform particular functionality of the described techniques.

It will be appreciated that computing systems 200 and 280, devices 250 and storage systems 260 are merely illustrative and are not intended to limit the scope of the present invention. The systems and/or devices may instead each include multiple interacting computing systems or devices, and may be connected to other devices that are not illustrated, including through one or more networks such as the Internet, via the Web, or via private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, digital music player devices, handheld gaming devices, PDAs, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated DFP Server system 240 may in some embodiments be distributed in various modules. Similarly, in some embodiments, some of the functionality of the DFP Server system 240 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the DFP Server system and/or DFP client software) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
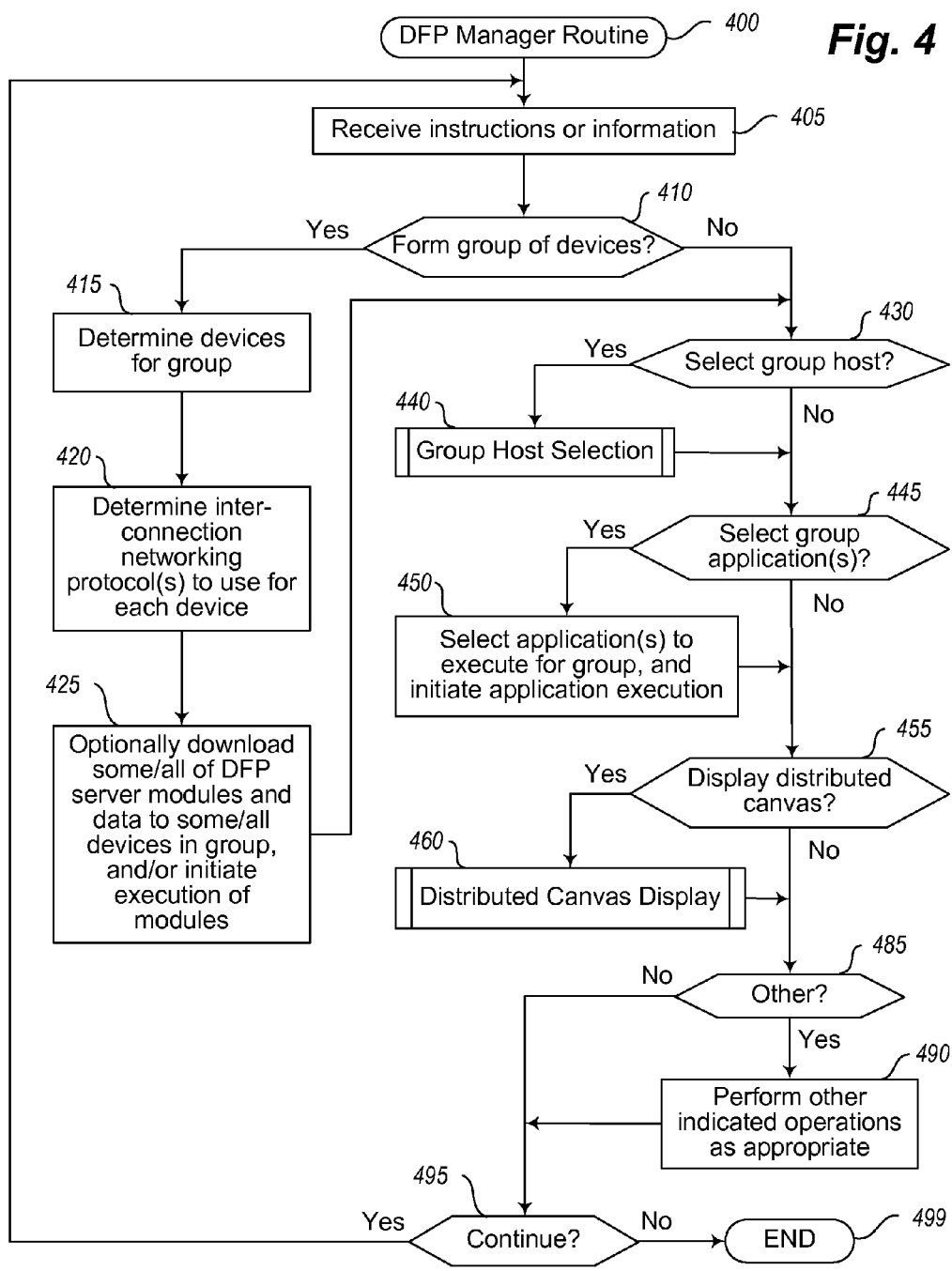
FIG. 4 is a flow diagram of an example embodiment of a DFP (Distributed Functionality Provider) Manager routine.

FIG. 4 is a flow diagram of an example embodiment of a DFP Manager routine 400, such as to provide a high-level overview of some functionality of an example embodiment of a DFP Server system and its Manager Module. Thus, the routine 400 may be performed by, for example, execution of the Manager Module 101 of the DFP Server 100 of FIG. 1A, or otherwise by the DFP Servers 100 and 240 of FIGS. 1B-1C and 2, respectively, or by one or more DFP client modules acting in place of a DFP server system. Thus, as described in greater detail elsewhere, such a routine 400 may be executed in various manners and various embodiments, such as by one or more remote computing systems providing a DFP server system to support one or more remote groups of client devices, on each of one or more or all of the client devices of a particular group (e.g., as part of DFP Client Module software executing on those devices), in a distributed manner across multiple devices of a group, etc.

The illustrated embodiment of the routine 400 begins at step 405, where one or more instructions or other types of information are received. The routine then continues to block 410 to determine if a request or instruction has been received to form a new group of devices, such as may be initiated by one or more devices of the new potential group (e.g., based on actions by the users of those devices) and/or as may be initiated by an embodiment of a DFP Server system based on matchmaking operations that have been initiated. In this example, if it is determined that instructions have been received to form a new group, the routine continues to block 415 to determine the devices to include in the group, such as based on one or more devices that initiated the creation of the group, and/or based on other factors discussed in greater detail with respect to performing matchmaking operations to select devices and users for a group. In block 420, the routine then determines one or more inter-connections (such as by determining particular inter-connection networking protocols to use) for each device in the group to use to enable its group-related communications, and initiates the establishments of such inter-connections if they do not already exist. After block 420, the routine continues to block 425 to optionally download some or all of the DFP system modules and/or data to some or all of the devices in the group, such as if those devices do not yet have those modules or data, and may further optionally initiate execution of newly downloaded or previously existing DFP system software modules to enable the devices to participate in the group.

After block 425, or if it is instead determined in block 410 that the instructions or information received in block 405 are not to form a new group of devices, the routine continues to block 430 to determine if instructions or information is received to select a group host for a specified group of devices, whether for an existing group that already previously had a host (e.g., in response to one or more changes that initiate new matchmaking group host selection activities) or instead for a new group just formed with respect to blocks 415-425. If it is determined to proceed to select a group host for a specified group, the routine continues to block 440 to execute a Group Host Selection routine, with one example of such a routine described in greater detail with respect to FIG. 5.

After block 440, or if it was instead determined in block 430 that the instructions or information received in block 405 are not to select a group host, the routine continues to block 445 to determine whether the instructions or information received in block 405 are to select one or more applications to execute on behalf of a group, whether a previously existing group or a group newly formed with respect to blocks 415-425. If so, the routine continues to block 450 to select one or more such applications to execute for the group (e.g., based on such applications being identified in the received instructions, or instead being automatically determined based on the devices and/or users of the group), and to initiate the application execution on some or all of the group devices. In some embodiments and situations, the routine may further initiate the download of application software to some or all of the group devices as part of the operations for block 450. As discussed in greater detail elsewhere, instructions to select an application to execute may be received in various manners, including based on one or more users requesting to execute the application and correspondingly being added to an existing group or placed in a newly created group to enable such group execution of the requested applications.

After block 450, or if it was instead determined in block 445 that the instructions or information received in block 405 are not to select one or more applications to execute for a group, the routine continues to block 455 to determine whether instructions or information are received in block 405 to initiate the display of a distributed canvas GUI for a group, or to otherwise update such a distributed canvas GUI display. If so, the routine continues to block 460 to execute a Distributed Canvas Display routine for the indicated group, with one example of such a routine discussed in greater detail with respect to FIGS. 6A-6B.

After block 460, or if it is instead determined in block 455 that the instructions or information received in block 405 are not to initiate or update the display of a distributed canvas GUI, the routine continues to block 485 to determine whether one or more other types of instructions or information are received in block 405. If so, the routine continues to block 490 to perform such other indicated operations as appropriate. Such other types of operations may include, for example, registering available applications and storing corresponding information, registering users and storing corresponding information, registering devices and storing corresponding information, storing or updating location information corresponding to users and/or devices, generating analytics information (whether in response to request for the information, or instead in a scheduled manner to enable later access), generating information for leader boards for particular users in games, etc.

After block 490, or if it was otherwise determined in block 485 that the information or instructions received in block 405 did not include other types of instructions or information, the routine continues to block 495 to determine whether to continue, such as until an explicit indication to terminate is received. If it is determined to continue, the routine returns to block 405, and otherwise continues to block 499 and ends.

Figure 5:
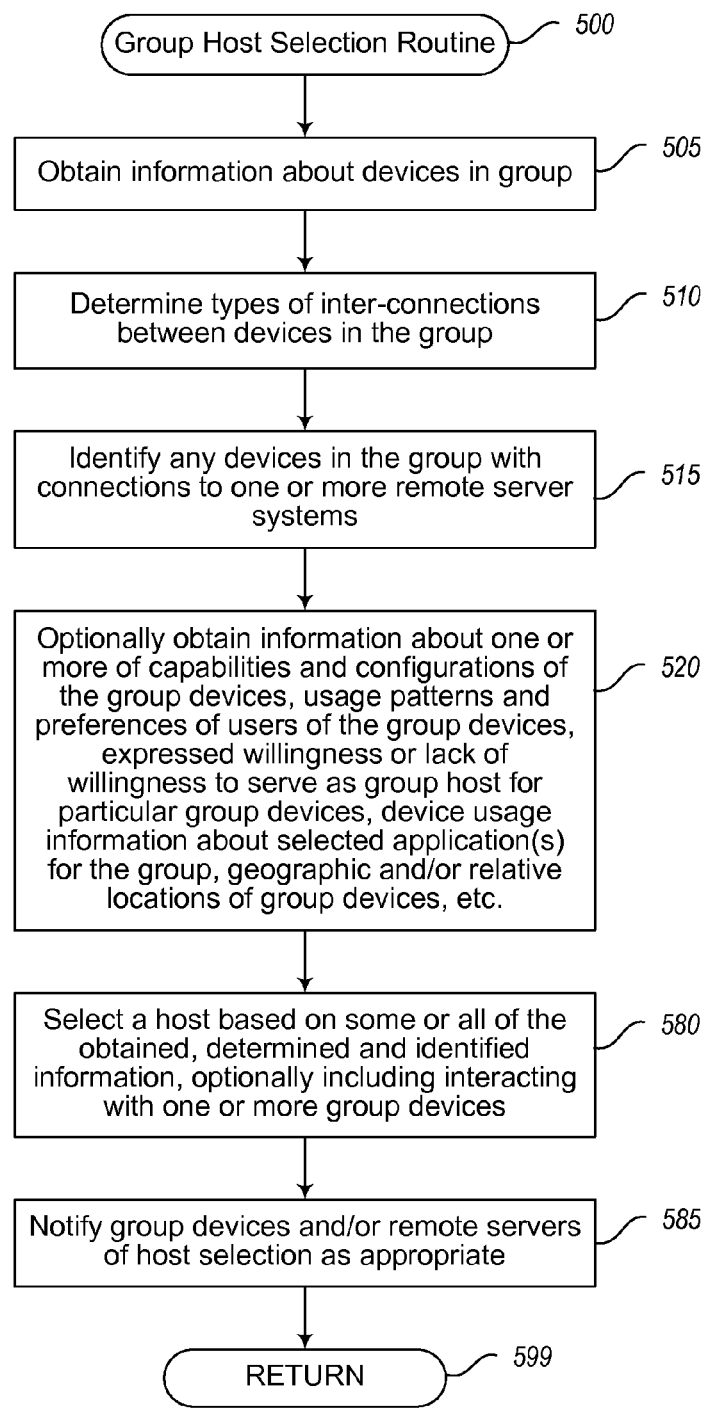
FIG. 5 is a flow diagram of an example embodiment of a Group Host Selection routine.

FIG. 5 is a flow diagram of an example embodiment of a Group Host Selection routine 500, such as to provide functionality related to selecting a current device to act as a host for a group of multiple devices. The routine 500 may be performed, for example, by a DFP Server system and/or one or more DFP Client modules, with the routine 500 being initiated in at least some embodiments and situations as described with respect to block 440 of FIG. 4 (although in other embodiments may be initiated in other manners, such as based on a group device or its users initiating a new group host selection). In other embodiments and situations, the routine 500 may be initiated in other manners, such as periodically, based on one or more changes for one or more devices of a group, in response to a request or instructions from a device in a group or a user of such a device, etc.

The example embodiment of the routine 500 begins at block 505, where information is obtained about the devices currently in an indicated group, such as information about a current role of each device in the group, capabilities for the devices, etc. In block 510, the routine then determines the types of inter-connections that are available between the devices in the group, such as based on their respective inter-connection capabilities. In block 515, the routine then identifies any devices in the group with connections to one or more remote server systems, or the ability to make such connections, although no such remote connections may be used in at least some embodiments and situations (e.g., if a group is formed and/or changes to operate after it is formed without use of a remote DFP Server system), and if so such operations of block 515 may not be performed.

After block 515, the routine continues to block 520 to optionally obtain information about one or more of a variety of types of factors that may be used in the selection of the host, depending on the current embodiment and configuration. Such other types of information are discussed in greater detail elsewhere, and may include one or more from the following non-exclusive list: capabilities and/or configurations of the group devices; usage patterns, preferences, and other information about users of the group devices; an expressed willingness or lack of willingness for a particular group device to serve as a group host, such as by the users of those devices previously or concurrently, or otherwise based on the configurations of those devices; usage patterns and other information about one or more applications selected to be executed for the group; geographic locations and/or relative locations of devices in the group; etc.

After block 520, the routine continues to block 580 to select one or more devices in the group to currently act as a host for the group based on some or all of the obtained, determined, and identified information described with respect to blocks 505-520, as described in greater detail elsewhere. In some embodiments, the selection may be made in a distributed manner by multiple devices of the group, based on interactions between the devices. In some embodiments, the decision may be made by a remote DFP Server system, optionally in conjunction with the device of the group that is selected to act as the host. After block 580, the routine continues to block 585 to optionally notify devices within the group and/or any remote servers being used of the host selection to enable operations of the group to proceed using the selected host device(s). After block 585, the routine continues to block 599 and returns, such as to return to block 440 of FIG. 4 if the routine was initiated from that location.

Figure 6A:
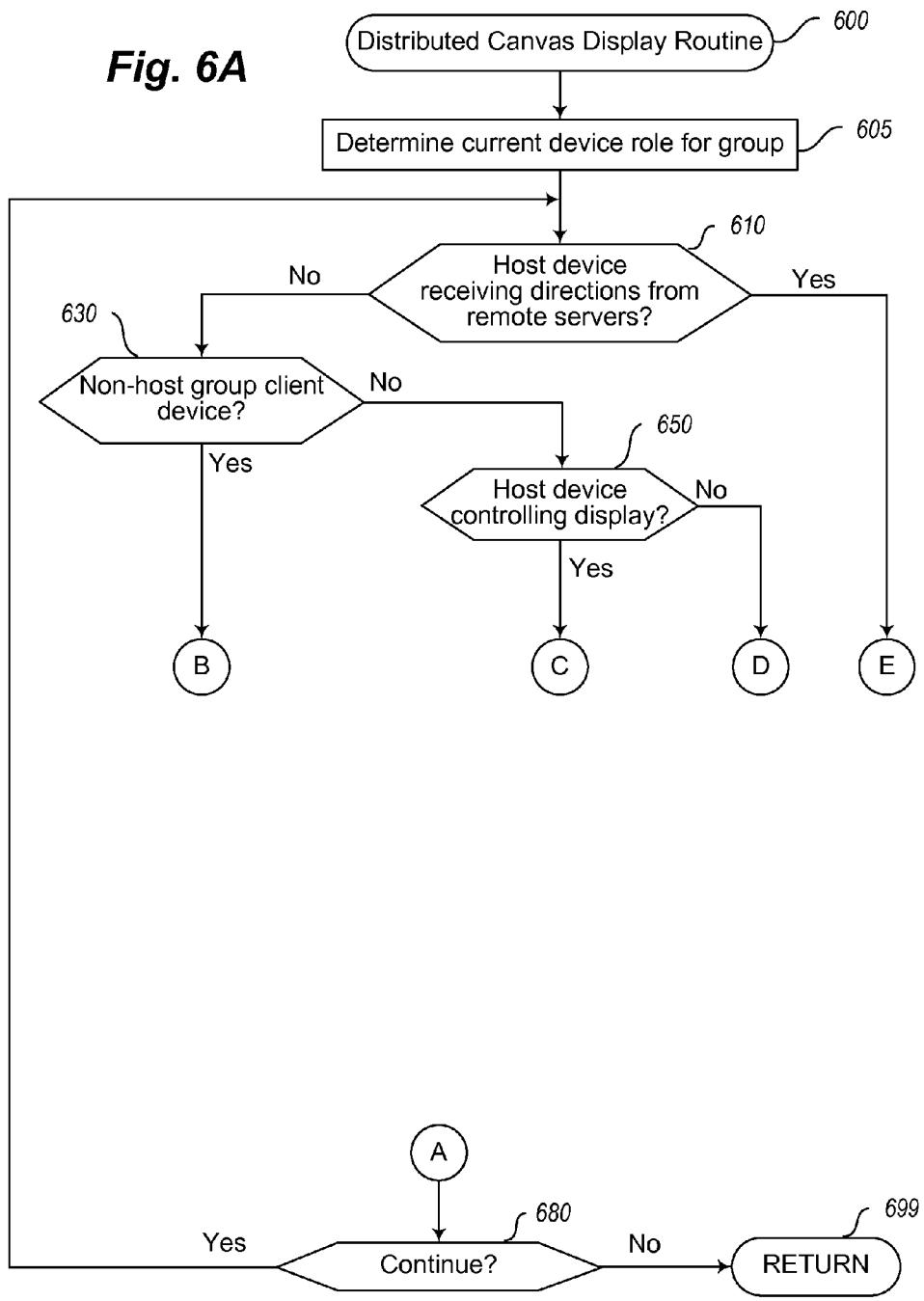
FIGS. 6A-6B are a flow diagram of an example embodiment of a Distributed Canvas Display routine.
Figure 6B:
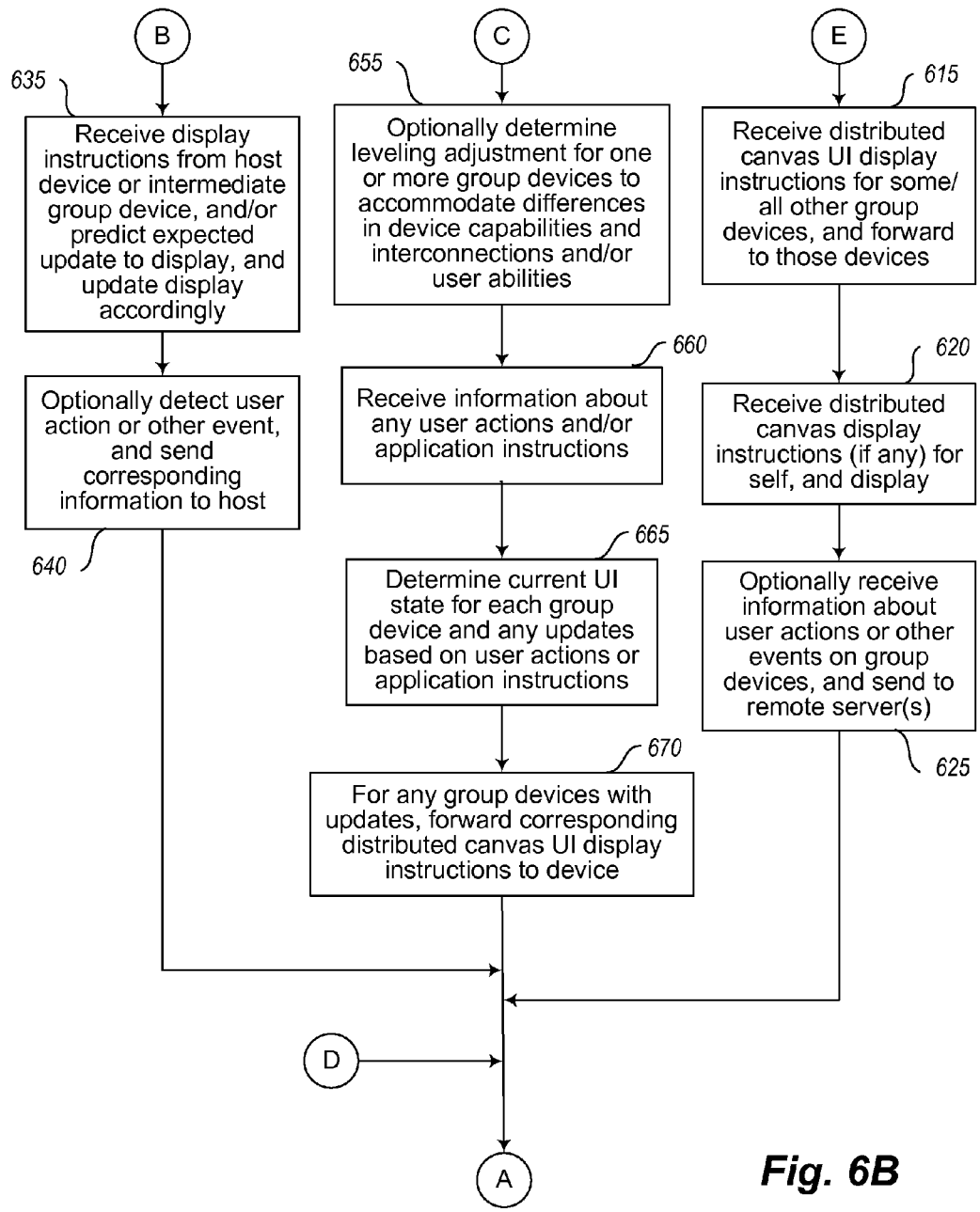

FIGS. 6A-6B are a flow diagram of an example embodiment of a Distributed Canvas Display routine 600, such as to provide functionality related to initiating or updating the display of a distributed canvas GUI across the displays of multiple devices of a group. The routine 600 may be performed, for example, by a DFP Server system and/or one or more DFP Client modules, with the routine 600 being initiated in at least some embodiments and situations as described with respect to block 460 of FIG. 4 (although in other embodiments may be initiated in other manners, such as based on an interaction of a user of the group with an already displayed distributed canvas GUI). The routine 600 may perform automated operations to determine and provide corresponding instructions to some or all devices in the group to control their displays, although in other embodiments the various devices in the group may each determine its own information to display, such as in a distributed manner by interacting with some or all other of the group devices.

The illustrated embodiment of the routine 600 begins in block 605, where the device or other computing system executing the routine determines its current role with respect to an indicated group for which a distributed canvas GUI display will be initiated or updated, such as whether acting as a host device or not, and if so whether the group activities are directed by the group host device or by a remote DFP Server system. The routine then continues to block 610 to determine if the current device is a host device within the group that is receiving directions on how to perform the distributed canvas GUI display from one or more remote servers, such as from a remote DFP Server system. If so, the routine continues to block 615, where it receives display-related instructions for some or all of the devices in the group from the remote servers, and forwards the instructions for each group device to that device. As discussed in greater detail elsewhere, in some cases the forwarding of instructions from the host device to another device in the group involves the use of one or more other intermediate devices in the group, such as based on the inter-connections that exist between the group devices. In box 620, the routine further initiates display on itself of any information for the distributed canvas GUI, such as based on instructions received from the remote servers, although in other embodiments and situations the host device may not participate as part of the distributed canvas GUI display. After block 620, the routine continues to block 625 to optionally receive information about any user actions or other events that have occurred on any of the group devices that may affect the distributed canvas GUI display (such as any events that have not been previously reported), and to send such information to the remote servers to enable corresponding updates (if any) to be initiated to the distributed canvas GUI display. While such actions of block 625 are illustrated in this example as occurring in a serial manner after block 620, it will be appreciated that such functionality may instead be implemented in other manners, such that any user may interact with their group device at any time, with such information being relayed in an immediate manner (e.g., in real time or near-real time) to the remote servers.

If it is instead determined in block 610 that the current device is not a host device receiving directions from one or more remote servers, the routine continues instead to block 630 to determine if the current device is a non-host client device of the group. If so, the routine continues to block 635 to receive instructions from the host device of the group (or an intermediate device that is forwarding such instructions from the host), and initiates a corresponding display or display update on the device. In some embodiments and situations, the client device may at certain times further perform automated operations to predict types of updates that are expected, and to initiate corresponding updates to the portion of the distributed canvas GUI being displayed even before instructions are received from the host. Such prediction functionality may be of use, for example, in situations in which connection communications with the host may be intermittently disrupted, if the portion of the distributed canvas GUI displayed on the client device is updated rapidly (e.g., in a constant or near-constant manner), etc. Non-exclusive examples of situations in which such prediction activities may be performed include when objects displayed on the GUI behave in a predictable manner (e.g., a moving object that travels in a straight line or otherwise predictable direction unless it is manipulated by the user or by the game; an object that performs periodic changes, such as a light that blinks on and off in a predictable manner; etc.). It will be appreciated that the prediction of such display activities may be performed in an application-specific manner, and that in at least some embodiments, the application will provide the information to enable the prediction to be performed, while in other embodiments and situations at least some of the prediction activities may be performed at least in part by the DFP Client software on the client device. In block 640, the device optionally detects a user action or other event that may cause a change to the display of the distributed canvas GUI for one or more devices of the group, and sends corresponding information to the host device (optionally via one or more intermediate devices). In a manner similar to that discussed with respect to block 625, such user actions or other events may be detected and handled in other manners in other embodiments.

If it is instead determined in block 630 that the current device is not a non-host client device in the group, the routine continues to block 650 to determine if the current device is a host device of the group that is controlling the display of the distributed canvas GUI, such as for a group that is operating without interactions with any remote DFP Server system at the current time. If so, the routine continues to block 655 to optionally determine one or more leveling adjustments to make for one or more devices in the group, such as to artificially slow down or otherwise change the display or capabilities provided on those group devices to accommodate differences in device capabilities, device inter-connections, and/or user abilities. In this manner, the DFP system may in some embodiments and situations attempt to adjust for such differences, such as to enable more equitable and/or more enjoyable game play or other application use amongst the devices in a group, while in other embodiments such differences may be accommodated in other manners (e.g., based on match-making operations regarding which devices and users are selected for a particular group, such as to group users and/or devices with similar abilities and capabilities).

After block 655, the routine continues to block 660 to receive information about any user actions and/or application instructions that have been received since a prior display of the distributed canvas GUI. As discussed with respect to blocks 625 and 640, such user actions or other events may be handled in various manners in various embodiments, including in an interrupt-driven manner, based on polling or queues, etc. After block 660, the routine continues to block 665 to determine a current GUI state for each device in the group (including any updates to be performed), such as based on any user actions, instructions from the application, or other events that have occurred. For example, if a user of a device has not interacted with a device since the last update to the portion of the distributed canvas GUI displayed on the device, and no actions of other users or other events on other devices have affected the display on that user's device, it may not be necessary to update the display, although in other embodiments device displays may always be updated at least in part (e.g., to show a current time or other current changing information). After block 665, the routine continues to block 670 to, for any group devices with updates, forward corresponding instructions to the device to initiate a display or update for the distributed canvas GUI for that device.

While the illustrated operations are discussed with respect to being performed by particular devices within a group, it will be appreciated that some or all such actions may similarly be performed by a remote DFP Server system that is controlling the display of a distributed canvas GUI for a group, such as to perform operations similar to those of 655-670 (e.g., based on interactions with a host device for the group corresponding to those of blocks 615-625). In addition, while the illustrated embodiment includes a host device that either acts on its own to control the display or instead acts to forward instructions received from one or more remote servers, in other embodiments one or more such host devices may act in coordination with one or more such remote servers, such that the remote servers provide some types of instructions and the host devices determine and provide other types of instructions to other group devices. Similarly, while the illustrated embodiment includes a client device that merely executes instructions received from a group host device (except when performing any client-side prediction activities), in other embodiments one or more such client group devices may act in coordination with one or more such host group devices, such that the group host devices provide some types of instructions and the client group devices determine and perform other types of instructions. It will also be appreciated that the display of a distributed canvas GUI on devices of a group may, in at least some embodiments, occur in a substantially continuous manner, such as to repeatedly perform at least some of the illustrated types of operations (e.g., many times per second for each client device).

After blocks 625, 640, or 670, or if it is instead determined in block 650 that the current device is not the host device controlling the display, the routine continues to block 695 to determine whether to continue, such as until an explicit indication to terminate is received. If it is determined to continue, the routine returns to block 610, although in other embodiments the routine 400 of FIG. 4 will instead be used to control repeated or otherwise subsequent updates to a distributed canvas GUI display by re-invoking the routine 600 as appropriate. If it is not determined to continue, the routine instead continues to block 699 and returns, such as to return to block 460 of FIG. 4 if that is where the routine 600 was initiated.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited by the exemplary details. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied.

What is claimed is:

1. A computer-implemented method comprising:
    receiving, by a configured computing system, information about an application to be executed for multiple users in a distributed manner for multiple mobile devices, wherein each of the multiple mobile devices has an associated user that is one of the multiple users and has a display screen for displaying information to the associated user;
    determining, by the configured computing system, information for an interactive GUI ("graphical user interface") of the application to be displayed in a distributed manner on the display screens of the multiple mobile devices, the determining including selecting a distinct subset of the interactive GUI for each of the multiple mobile devices;
    providing, by the configured computing system, the determined information for the interactive GUI to the multiple mobile devices in a manner to cause each of the multiple mobile devices to display the selected subset of the interactive GUI for that mobile device on the display screen of that mobile device, so that the multiple users each receive displayed information for the application that is different from information for the application displayed to other of the multiple users; and
    in response to receiving an indication of an interaction by one of the multiple users with the selected subset of the interactive GUI displayed on one of the multiple mobile devices, providing, by the configured computing system, updated information for the interactive GUI of the application to cause at least some of the multiple mobile devices to each update information for the application that is displayed on the display screen of that mobile device, so that at least some of the multiple users receive updated displayed information for the application based on the interaction by the one user.

2. The method of claim 1 wherein the multiple mobile devices are part of a defined group, and wherein the method further comprises, after the providing of the updated information for the interactive GUI of the application:
    determining a change in which mobile devices are part of the defined group; and
    adjusting the displayed interactive GUI of the application to reflect the mobile devices that are part of the defined group after the determined change, the adjusting of the displayed interactive GUI including modifying which subset of the interactive GUI is displayed on at least one of the multiple mobile devices that remains part of the defined group after the determined change.

3. The method of claim 2 wherein the determined change includes adding an additional mobile device to the group, and wherein the adjusting of the displayed interactive GUI includes initiating displaying, on a display device of the additional mobile device, at least some of the selected subset of the interactive GUI that was previously displayed on one of the multiple mobile devices before the determined change.

4. The method of claim 2 wherein the determined change includes removing one of the multiple mobile devices from the group, and wherein the adjusting of the displayed interactive GUI includes initiating displaying, on a display device of one of the multiple mobile devices other than the removed one mobile devices, at least some of the selected subset of the interactive GUI that was previously displayed on the removed one mobile device before the determined change.

5. The method of claim 1 further comprising automatically selecting a first mobile device of the multiple mobile devices to act as a host device to manage display of the interactive GUI of the application in the distributed manner on the display screens of the multiple mobile devices, and wherein the providing of the determined information for the interactive GUI to the multiple mobile devices includes, under control of the first mobile device, sending one or more communications to the multiple mobile devices other than the first mobile device.

6. The method of claim 5 further comprising, after the providing of the determined information for the interactive GUI to the multiple mobile devices, selecting a second mobile device of the multiple mobile devices to replace the first mobile device as the host device for managing the display of the interactive GUI of the application in the distributed manner on the display screens of the multiple mobile devices, and wherein the providing of the updated information for the interactive GUI of the application includes, under control of the second mobile device, sending one or more additional communications to the multiple mobile devices other than the second mobile device.

7. The method of claim 5 wherein the configured computing system is the first mobile device.

8. The method of claim 1 wherein the providing of the updated information for the interactive GUI of the application includes:
    determining, by the configured computing system, and for each of the at least some mobile devices, one or more updates to the selected subset of the interactive GUI for that mobile device that are caused by the interaction by the one user; and
    causing, by the configured computing system, and for each of the at least some mobile devices, the mobile device to display the determined one or more updates for that mobile device.

9. The method of claim 1 wherein the selected distinct subset of the interactive GUI for each of the multiple mobile devices is a distinct horizontal slice of a visual display for a determined state of the interactive GUI.

10. The method of claim 1 wherein the selected distinct subset of the interactive GUI for each of the multiple mobile devices is a distinct vertical slice of a visual display for a determined state of the interactive GUI.

11. The method of claim 1 wherein the selected distinct subset of the interactive GUI for each of the multiple mobile devices corresponds to a distinct time in a changing visual display for the interactive GUI.

12. The method of claim 1 wherein the selected distinct subset of the interactive GUI for each of at least some of the multiple mobile devices includes an overlapping portion with the selected distinct subset of the interactive GUI for each of one or more other of the multiple mobile devices.

13. The method of claim 1 wherein the selected distinct subset of the interactive GUI for each of the multiple mobile devices, when combined, forms an entirety of a visual display for the interactive GUI.

14. The method of claim 1 wherein the application is a game application, and wherein the interaction by the one user includes manipulating a displayed element of the game.

15. The method of claim 1 wherein the application is a collaborative software application that enables the multiple users to work together towards a common goal, and wherein the interaction by the one user includes a contribution by the one user towards the common goal.

16. The method of claim 1 further comprising, after the providing of the updated information for the interactive GUI of the application:
   receiving information about an event generated by the application; and
   providing additional updated information for the interactive GUI of the application based on the event to cause at least one of the multiple mobile devices to update information for the application that is displayed on the display screen of the at least one mobile device.

17. The method of claim 1 wherein the selecting of the distinct subset of the interactive GUI for at least some of the multiple mobile devices is based at least in part on determined relative locations of the at least some mobile devices to each other.

18. The method of claim 1 wherein the selecting of the distinct subset of the interactive GUI for at least one of the multiple mobile devices is based at least in part on a determined orientation of the at least one mobile device.

19. The method of claim 1 wherein the providing of the determined information for the interactive GUI to the multiple mobile devices includes determining differences in capabilities of two or more of the multiple mobile devices, and adjusting interactions with at least one of the two or more mobile devices to reduce the determined differences, the adjusting of the interactions including adjusting how the providing of the determined information is performed for the at least one mobile device or adjusting what information is included in the determined information for the at least mobile one device.

20. The method of claim 1 wherein the providing of the determined information for the interactive GUI to the multiple mobile devices includes determining differences in abilities of two or more of the multiple users, and adjusting interactions with at least one of the two or more users to reduce the determined differences, the adjusting of the interactions including adjusting how the providing of the determined information is performed for a mobile device of the at least one user or adjusting what information is included in the determined information for the mobile device of the at least one user.

21. The method of claim 1 wherein the multiple mobile devices are part of a defined group, and wherein the method further comprises selecting one or more of the multiple mobile devices to be part of the group based at least in part on capabilities of the selected one or more mobile devices.

22. The method of claim 1 wherein the multiple mobile devices are part of a defined group, and wherein the method further comprises selecting one or more of the multiple users so that mobile devices of the selected one or more users are part of the group, the selecting of the one or more users being based at least in part on determined abilities of the selected one or more users.

23. The method of claim 1 further comprising, under control of a first mobile device of the at least some mobile devices:
   displaying information for the interactive GUI of the application on the display screen of the first mobile device based on the provided updated information for the interactive GUI;
   predicting additional information that will be received to cause a further update to the displayed information for the interactive GUI of the application on the display screen of the first mobile device; and
   in response to the predicting, updating the display screen for the first mobile device to reflect the predicted additional information.

24. The method of claim 1 wherein the configured computing system is part of a distributed functionality provider server that interacts with the multiple mobile devices over one or more networks.

25. The method of claim 1 wherein the application is provided by a first entity, and wherein the method further comprises obtaining promotional information from at least one second entity distinct from the first entity, and initiating display of the obtained promotional information on at least one of the multiple mobile devices as part of the interactive GUI of the application.

26. A computer-implemented method comprising:
   receiving, by a configured computing system of a distributed functionality provider server system, information about a defined group of multiple mobile devices in use by multiple users and about a game application to be played by the multiple users together in a distributed manner on the multiple mobile devices, wherein each of the multiple mobile devices has an associated user that is one of the multiple users and has a display screen for displaying information to the associated user, wherein the multiple mobile devices are inter-connected via one or more wireless connections, and wherein two or more of the multiple mobile devices each has capabilities to participate in an additional connection to the configured computing system;
   determining, by the configured computing system, a current state of an interactive GUI ("graphical user interface") of the game application to be simultaneously displayed in a distributed manner on the display screens of the multiple mobile devices, the determining including selecting a distinct subset of the interactive GUI for each of the multiple mobile devices;
   selecting, by the configured computing system, one of the two or more mobile devices to act as a host device for the group to manage communications between the configured computing system and the multiple mobile devices of the group, the selecting being based at least in part on the capabilities of the selected one mobile device to participate in the additional connection; and
   exchanging, by the configured computing system, multiple communications with the multiple mobile devices of the group via the selected one mobile device, the exchanging of the multiple communications including sending one or more communications to the selected one mobile device that include specified information to be forwarded to other mobile devices of the group, the specified information including, for each of the other mobile devices of the group, information to cause the mobile device to display the selected distinct subset of the interactive GUI for that mobile device on the display screen for that mobile device, so that the multiple users each receive displayed information for the application that is different from information for the application displayed to other of the multiple users, and wherein a combination of the selected distinct subsets displayed on the multiple mobile devices includes all of the current state of the interactive GUI.

27. The method of claim 26 further comprising, in response to receiving an indication of an interaction by one of the multiple users with the selected distinct subset of the interactive GUI that is displayed on one of the multiple mobile devices with which the one user is associated:
    providing, by the configured computing system, updated information for the interactive GUI of the application to cause at least some of the multiple mobile devices to each update the displayed selected distinct subset of the interactive GUI that is displayed on the display screen for that mobile device, so that at least some of the multiple users receive updated displayed information for the application based on the interaction by the one user.

28. The method of claim 26 further comprising, after the exchanging of the multiple communications with the multiple mobile devices of the group via the selected one mobile device:
    selecting, by the configured computing system, a new host device for the group from the two or more mobile devices, the selected new host device being distinct from the selected one mobile device; and
    continuing, by the configured computing system, interactions between the configured computing system and the multiple mobile devices of the group to maintain the interactive GUI of the game application being simultaneously displayed in the distributed manner on the display screens of the multiple mobile devices, the continuing of the interactions including exchanging multiple additional communications with the multiple mobile devices of the group via the selected new host device.

29. The method of claim 26 further comprising, under control of one of the other mobile devices of the group:
    receiving information forwarded from the selected one mobile device;
    displaying, based on the received forwarded information, the selected distinct subset of the interactive GUI for the one other mobile device on the display screen for the one other mobile device;
    predicting additional information that will be received to cause an update to the displayed selected distinct subset of the interactive GUI on the display screen for the one other mobile device; and
    before receiving the additional information forwarded from the selected one mobile device, updating the display screen for the one other mobile device to reflect the predicted additional information.

30. A system comprising:
    one or more processors of a computing device; and
    one or more modules that are configured to, when executed by at least one of the one or more processors, manage interactions for a group that includes multiple mobile devices by:
        receiving information about an application to be executed for multiple users in a distributed manner for the group, wherein each of the multiple mobile devices has an associated user that is one of the multiple users and has a display screen for displaying information to the associated user;
        determining to act as a host device for the group to manage execution of the application for the group;
        determining information for a graphical user interface ("GUI") of the application to be displayed in a distributed manner on the display screens of the multiple mobile devices, the determining including selecting a distinct subset of the GUI for each of the multiple mobile devices; and
        providing, based on the determining to act as the host device, the determined information for the GUI to the multiple mobile devices in a manner to cause each of the multiple mobile devices to display the selected subset of the GUI for that mobile device on the display screen of that mobile device, so that the multiple users each receives displayed information for the application that is different from information for the application displayed to other of the multiple users.

31. The system of claim 30 wherein the managing of the interactions for the group further includes:
    in response to receiving an indication of an interaction by one of the multiple users with the selected subset of the GUI displayed on one of the multiple mobile devices with which the one user is associated, providing updated information for the GUI to cause at least some of the multiple mobile devices to each update information on the display screen of that mobile device, so that at least some of the multiple users receive updated displayed information based on the interaction by the one user.

32. The system of claim 30 wherein the managing of the interactions for the group further includes receiving communications from one or more remote server computing systems, the received communications including at least some of the determined information for the GUI.

33. The system of claim 30 wherein the computing device is one of the multiple mobile devices, and wherein the one or more modules include software instructions for execution by the at least one processor.

34. The system of claim 30 wherein the one or more modules consists of one or more means for performing the managing of the interactions for the group.

* * * * *